United States Patent
Young et al.

(10) Patent No.: US 11,615,412 B2
(45) Date of Patent: *Mar. 28, 2023

(54) NETWORK DATA MANAGEMENT AND DATA SECURITY

(71) Applicant: Synchrony Bank, Stamford, CT (US)

(72) Inventors: Taylor Young, Stamford, CT (US); Chris Otten, Stamford, CT (US)

(73) Assignee: SYNCHRONY BANK, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/400,343

(22) Filed: Aug. 12, 2021

(65) Prior Publication Data

US 2022/0036345 A1 Feb. 3, 2022

Related U.S. Application Data

(63) Continuation of application No. 17/220,154, filed on Apr. 1, 2021, now Pat. No. 11,138,599.

(60) Provisional application No. 63/003,797, filed on Apr. 1, 2020.

(51) Int. Cl.
| | |
|---|---|
| *G06Q 20/38* | (2012.01) |
| *G06F 16/955* | (2019.01) |
| *H04W 12/06* | (2021.01) |
| *H04W 12/65* | (2021.01) |
| *G06K 7/14* | (2006.01) |

(52) U.S. Cl.
CPC ......... *G06Q 20/385* (2013.01); *G06F 16/955* (2019.01); *G06K 7/1417* (2013.01); *H04W 12/068* (2021.01); *H04W 12/65* (2021.01)

(58) Field of Classification Search
CPC ............................ G06Q 20/385; G06F 16/955

USPC .......................................................... 705/44
See application file for complete search history.

(56) References Cited

U.S. PATENT DOCUMENTS

| | | |
|---|---|---|
| 2002/0112178 A1 | 8/2002 | Scherr |
| 2006/0036548 A1 | 2/2006 | Roever |
| 2015/0088756 A1 | 3/2015 | Makhotin |
| 2015/0310431 A1 | 10/2015 | Lakshmanan |
| 2018/0300471 A1 | 10/2018 | Jain et al. |
| 2020/0396190 A1 | 12/2020 | Pickman |

(Continued)

FOREIGN PATENT DOCUMENTS

| | | |
|---|---|---|
| EP | 2479696 A1 | 7/2012 |
| WO | 2018111858 A1 | 6/2018 |

OTHER PUBLICATIONS

International Search Report and Written Opinion dated Jun. 21, 2021 in International Application PCT/US2021/025329.

(Continued)

*Primary Examiner* — Allyson N Trail
(74) *Attorney, Agent, or Firm* — Polsinelli LLP

(57) ABSTRACT

Systems, devices, methods, instructions, and other implementations are described for network data management. One embodiment involves request data received at a device associated with a digital lockbox, where the request data includes identifying information for an originating device associated with a location and is associated with a user device. A unique token is generated with the identifying information. The unique token can be used to tokenize a network link to create a secure one-time link. The system transmits the one-time link, which can then be used to facilitate secure communications between a computing system associated with the originating device and the user device.

20 Claims, 17 Drawing Sheets

(56) References Cited

U.S. PATENT DOCUMENTS

2021/0103679 A1  4/2021  Patel
2021/0120316 A1  4/2021  Johnson

OTHER PUBLICATIONS

International Preliminary Report on Patentability dated Oct. 13, 2022 in International Application PCT/US2021/025329.

1600

RECEIVING REQUEST DATA, THE REQUEST DATA INCLUDING IDENTIFYING INFORMATION FOR AN ORIGINATING DEVICE ASSOCIATED WITH A LOCATION, WHEREIN THE REQUEST DATA IS FURTHER ASSOCIATED WITH A USER DEVICE
1605

STORING SECURE DATA ASSOCIATED WITH THE REQUEST DATA AND THE ORIGINATING DEVICE IN A DIGITAL LOCKBOX, WHEREIN THE DIGITAL LOCKBOX IS ASSOCIATED WITH A NETWORK LOCATION
1610

GENERATING A UNIQUE TOKEN USING THE IDENTIFYING INFORMATION, AND WHEREIN THE UNIQUE TOKEN IS ASSOCIATED WITH THE SECURE DATA IN THE DIGITAL LOCKBOX AT THE NETWORK LOCATION
1615

TRANSMITTING THE UNIQUE TOKEN, WHEREIN WHEN THE UNIQUE TOKEN IS RECEIVED AT THE USER DEVICE, THE ORIGINATING DEVICE USES THE ONE-TIME LINK TO ACCESS THE SECURE DATA IN THE DIGITAL LOCKBOX AT THE NETWORK LOCATION
1620

FACILITATING SECURE COMMUNICATIONS BETWEEN A COMPUTING SYSTEM ASSOCIATED WITH THE ORIGINATING DEVICE AND THE USER DEVICE
1625

DYNAMICALLY UPDATING THE DIGITAL LOCKBOX WITH TRACKING DATA ASSOCIATED WITH THE SECURE COMMUNICATIONS
1630

FIGURE 16

NETWORK DATA MANAGEMENT AND DATA SECURITY

CROSS REFERENCE TO RELATED APPLICATIONS

The present Application is a continuation of U.S. patent application Ser. No. 17/220,154 filed Apr. 1, 2021, which claims priority to U.S. Provisional Application 63/003,797 filed on Apr. 1, 2020, all of which are incorporated herein by reference in their entireties.

FIELD OF THE DISCLOSURE

The present disclosure relates to network data management, and data security for sensitive information. Some examples particularly use a digital lockbox having an application programming interface that allows secure tokenized one-time links to access data in the digital lockbox. Unique tokens from a token service can be used in generating the links as well as for securing and tracking access to data in the digital lockbox.

BACKGROUND

Users often use networks and associated computing devices to transmit, receive, store, and manage secure data, such as personal identifying information (e.g., government issued identifiers, financial data, or other such sensitive information). Such sensitive data can be used with a network when a network user, for example, seeks to obtain credit from a lending institution for a variety of purposes, such as a purchase a home, a car, or a business. Adding security to options for accessing or applying for such credit can create barriers to transactions between users, merchants, and lenders. When a decision is made by a lending institution to extend credit to a user, the creditworthiness of the user may be assessed using a multitude of scores, rules, signals, and thresholds. These sets of available credit scores and algorithms focus on the probability of repayment if the user borrows money. The data used in such decisions can be subject to a variety of privacy and regulatory considerations. Such considerations can further create barriers in the context of network communications and data management in a communication system for the data used to facilitate lending options and associated purchase transactions.

BRIEF DESCRIPTION OF THE DRAWINGS

FIG. 16 shows an illustrative example of a process for network data management in accordance with at least one embodiment;

DETAILED DESCRIPTION

In the following description, for the purposes of explanation, specific details are set forth in order to provide a thorough understanding of certain inventive embodiments. However, it will be apparent that various embodiments may be practiced without these specific details. The FIGS. and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Certain network systems, such as those involved in financial and credit transactions, are subject to significant privacy and security concerns. Management of data in such networks have additional considerations beyond simple transmission of data, including fraud and regulatory considerations. Some examples described herein include the use of a digital lockbox to secure sensitive user data, and to manage interactions with the sensitive user data. In some examples, unique tokens and/or a secure one-time links are used to facilitate privacy and security in communications between a merchant and a user of the merchant as part of network data management. A secure one-time link can be tokenized (e.g., using a unique token) to implement security and improve the performance of a network system and devices in a network system through improved security. Such tokens and links can both limit access to sensitive data and facilitate tracking the identity of parties that access the sensitive data. Some examples provide such security in a specific context of credit and purchase communications, while other examples provide a system that can be structured to be flexibly integrated with a variety of specific data management contexts.

Point of sale devices (e.g., originating devices for financial transactions or merchant based consumer credit requests) particularly involve security and privacy risks, where user and merchant financial systems are accessible by public users and merchant employees, and a point of vulnerability for malicious access by unauthorized third parties. Aspects described herein improve the operation of networks and devices for use in payment systems by supporting additional functionality (e.g., access to additional funding sources and/or additional financial data associated with transaction funding sources) while providing transaction security and privacy of sensitive consumer information (e.g., personal identification information (PII) and payment card industry (PCI) data).

Figure 1:
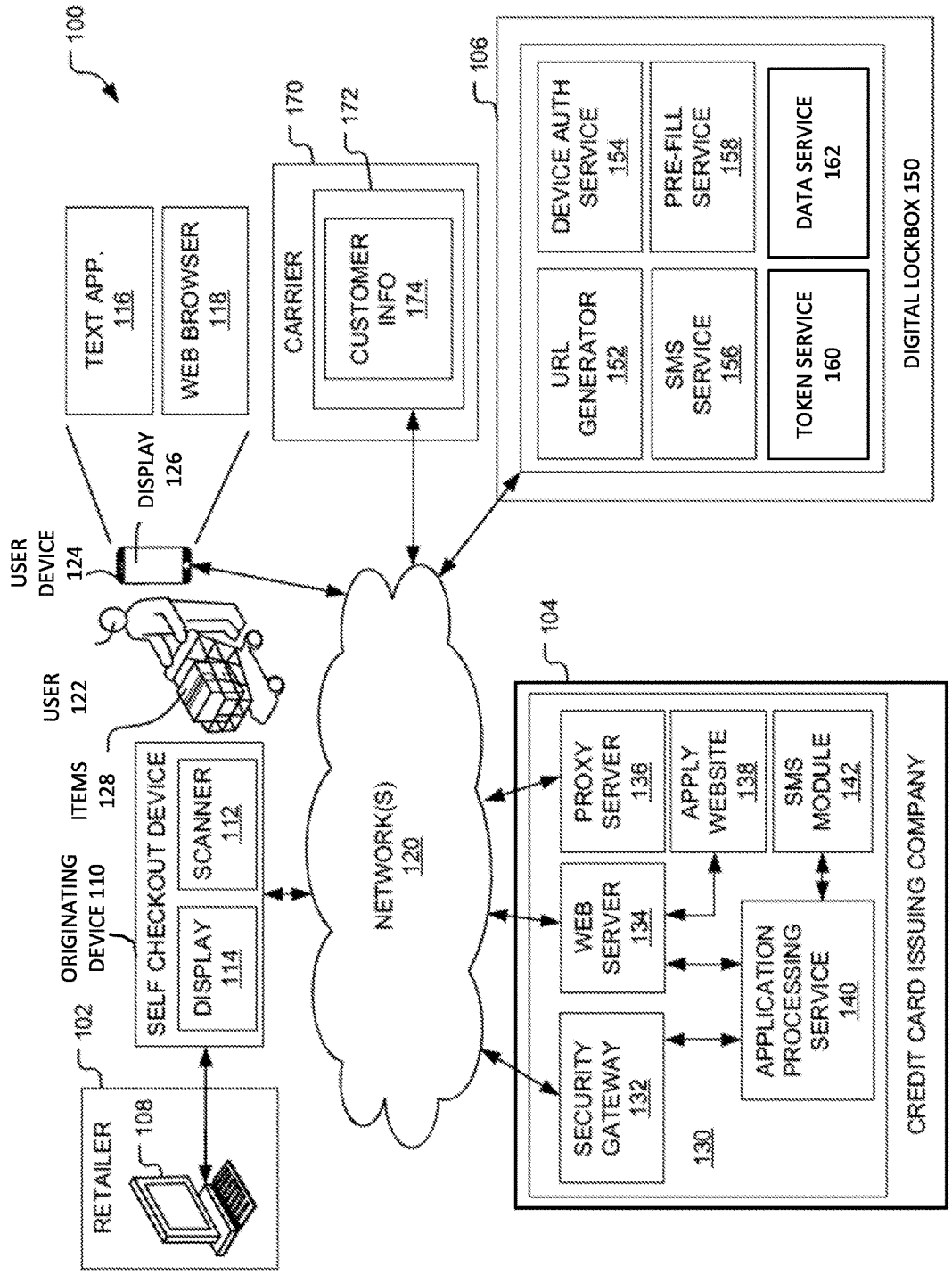
FIG. 1 shows an illustrative system that can be used for network data management in accordance with examples described herein.

FIG. 1 is a block diagram of a system 100 in which network data management is performed in accordance with some examples. The example system 100 includes a retailer 102, an account issuing system 104, and an authentication entity 106. In some systems, aspects can be merged, such as for example, the authenticating entity 106 being merged with the credit issuing system 104 such that devices of entity 106 and system 104 can be the same device or devices. The retailer 102 (e.g. a merchant or other client of authentication entity 106) includes a retail computing system 108 connected to at least one checkout register or device 110. The illustrated originating device 110 includes a scanner 112 (e.g., a barcode scanner) and a display 114. Other implementations can include a magnetic strip scanner or other payment input, a keypad, or other such elements. Additional examples of an originating device can be a tablet device, a smartphone, a laptop computer, or any other such device that can be accessed by a user, either directly, or through an employee of the retailer. The retail computing system 108 may be directly connected or connected by one or more networks 120 (described below) to the originating device 110. The retail computing system 108 and the originating device 110 may each be implemented by one or more computing devices, which may each be implemented as a computing device with architecture 1700 described below and illustrated in FIG. 17.

Referring to FIG. 1, the originating device 110 is configured to be operated by a user 122 having a user device 124 (e.g., a cellular telephone) with a display device 126 (e.g., a conventional touch screen). For example, the user 122 may purchase one or more items 128 using the originating device 110. As will be described below, the user 122 may also use the originating device 110 and the mobile device 124 to apply for credit. Enabling the user 122 to request credit at the originating device 110 and complete the application process using the mobile device 124 gives the user 122 the opportunity to save money or make flexible financial arrangements by applying for credit when it is needed in a quick and easy manner. The user device 124 can access various communication channels, including short message service (SMS), text, application based communications, e-mail, web browsers, or other such communication channels.

Referring to FIG. 1, mobile services are provided to the mobile device 124 by a mobile service provider or carrier 170. The carrier 170 operates one or more computing devices 172 configured to communicate over the network(s) 120. The computing device(s) 172 may each be implemented as the computing device with architecture 1700 described below and illustrated in FIG. 17.

The issuing system 104 operates one or more computing devices 130. The computing device(s) 130 implement a security gateway 132, a web server 134, a proxy server 136, an application processing service 140, and a SMS module 142. The security gateway 132 is configured to communicate with the SCO device 110 over the network(s) 120. The web server 134 and the proxy server 136 are both connected to the network(s) 120. The web server 134 is configured to generate an apply website 138. The application processing service 140 is configured to communicate with the security gateway 132 and/or the web server 134. The SMS module 142 is configured to communicate with the application processing service 140. The SMS module 142 may be implemented by middleware. By way of a non-limiting example, the computing device(s) 130 may each be implemented as the computing device 1700 described below and illustrated in FIG. 17.

The authentication entity 106 operates a digital lockbox 150 which can function as a repository of secure data that can be accessed using tokenized security interactions. The digital lockbox 150 can, in various examples, store sensitive data as part of data service 162. Interactions with the sensitive data of data service can be associated with unique tokens and/or unique single use Uniform Resource Locators (URLs). As described herein, tokenization combined with direct interaction of user devices 124 with the digital lockbox 150 provides enhanced functionality, security, and user privacy in different implementations.

Authentication entity 106 can operate one or more computing devices as part of digital lockbox 150 configured to communicate over the network(s) 120. The authentication computing device(s) of digital lockbox 150 may implement a generator 152, a device authentication service 154, an SMS service 156, a pre-fill service 158, a token service 160, and/or other similar services. By way of a non-limiting example, the authentication computing device(s) 150 may each be implemented as the computing device with architecture 1700 described below and illustrated in FIG. 17.

As described above, digital lockbox 150 can store and act as a gatekeeper for sensitive data. Data service 162 can include a secure database or access to a secure database to store such information. Additionally, data service 162 can both include additional functionality as well as interactions with other services of digital lockbox 150. In some examples, data service 162 includes an application programming interface (API) to facilitate network access to the data manage by data service. The API can allow access to specific data of data service 162, for example, by use of unique one-time URLs. In some example, data service can identify and track party affiliations with certain data. For example, data access sessions (e.g., groups of communications associated with a transaction, a unique token, or other such communication groupings) can be associated with a physical location (e.g., a merchant store), an specific originating device 110 (e.g., individually tracking 20 different originating devices 110 in a location), by an account identifier (e.g., associated with a merchant employee logged into an originating device), by a user, or by any other such association for a transaction. If a user A visits a store location M and is helped by employee X using originating device Z, some examples can track both the data stored in lockbox 150 for the transaction, the individual communications that are part of the transaction (e.g., communications receiving or transmitting the secure data stored in digital lockbox), as well as each action by user A, employee X, or device Z. Data analysis or grouping of data for multiple employees or originating devices can be used to track data at different levels, such as at a store location M level, a regional group of stores, departments within a store location (e.g., groupings of employees or devices within a store) or across multiple stores (e.g., performance of a particular department across multiple stores). Such data can be tracked and related to interactions with secure data and a digital lockbox, without providing any access to the secure data. In some examples, access to such data can further be tracked, such that a request for metrics associated with a digital lockbox are assigned a unique token and/or a single use URL, and tracked as described herein. Metrics can include offer acceptance rates at a POS level, location level, employee level, regional level, or at any other such level. Such a system can provide dynamic tracking of system use and secure data access in real-time, while maintaining data security. As transactions occur, the data in a digital lockbox can be updated in real-time with the details of a secure transaction communication (e.g., requests, unique token generation, passing of a token to different entities, and use of the token to access secure data from the digital lockbox). Metrics can similarly be updated in real-time as transactions occur, allowing real-time tracking of dynamic system use.

As described herein, a user device 124 can be used in conjunction with originating device 110 to establish secure communications between user 122 and retailer system 108. In some contexts, a user 122 is concerned about privacy and financial communications, in particular with respect to a retailer employee that may be communicating with user 122. A user 122 can additionally have concerns about data being communicated with retailer system 108 being visible to checkout employees of the retailer in ways that user 122 can wish to avoid, such as the possibility of a credit request being rejected. Examples described herein use a unique URL generated by URL generate 152 of authentication entity 106 to establish secure communications between user device 124 and retailer system 108 in ways that enable additional privacy and security. This also enables initiation of certain data communications using originating device 110 to allow a retailer to improve sales through offers to users made through devices associated with the retailer, such as originating device 110.

In various examples described herein, originating device 110 can use information from retail system 108 to identify offers available from system 104. In response to an indication of interest from a user 122 (e.g. using originating device 110), the retail computing system 108 can communicate request data to authentication entity 106. This can include identifying information from originating device 110 or user device 124 that can be used by device authentication service 154 to confirm information regarding devices related to the request data. This can include data about a location or store associated with originating device 110. This can include identifying account information, location information, or any other such context information about user device 124. The request data and information from device authentication service 154 can also provide information to other services. For example, SMS service 156 can identify whether authentication entity 106 has authorization to communicate with user device 124 in accordance with regulations limiting the ability for a business to initiate communications with user devices such as device 124. Additionally, based on other information associated with the request data, such as an expected credit request associated with the request data, pre-fill service 158 can be activated to identify or generate information for a credit request or other such information to be used in a subsequent communication from authentication entity 106 to either user device 124 or originating device 110.

Token service 160 can act in a number of ways to facilitate secure communications between user 122 and various other services and devices, including retail computing system 108 and issuing system 104. Additionally, token service 160 can tokenize a URL generated for user 122 by URL generator 152 in response to request data received via retail computing system 108. Tokenization is a process of substituting sensitive data elements with non-sensitive equivalents (e.g. tokens). The token is a reference identifier that can be mapped to the sensitive data via token service 160. Such a token service 160 can use large random number in combination with other systems, such as timing systems, to limit and secure the use of sensitive data being communicated over networks such as networks 120.

In some systems, information from an originating device 110 can be used by a token service 160 to generate a secure unique URL via URL generator 152 that has a use specific to retail computer system 108 or originating device 110. Such use can further be limited by use specific to user 122 or user device 124. Additional limits can be applied to specific items 128 in association with a specific user 122 or originating device 110. For example, if request data received at authentication entity 106 includes information about a location for originating device 110, an item 128 at that location that a user 122 is considering purchasing, along with information about the user device 124 and a credit request, then a token service 160 can create a secure URL in conjunction with URL generator 152 to facilitate a credit offer specific to the location of originating device 110 and purchase item 128 that can only be accessed by user device 124. Additional limitations such as time limitations can be added, so that the secure URL can only be accessed via user device 124 for a limited amount of time (e.g. 10 minutes, 1 hour, 1 day, etc.) Token service 160 can be used in conjunction with other information both to allow generation of a tokenized URL with URL generator 152, as well as to manage responses to the URL initiated from user device 124. This can include generating responses when a time limit is exceeded or an unexpected device uses the secure URL. This can also include accessing secure information with a token is received from an authorized device (e.g. client device 124 or originating device 110).

As described above, in some examples, authentication entity and credit issuing system 104 can, in some implementations, be the same system. In such a system, a token service 160 can further act to generate tokens for credit numbers or other aspects of financial transactions which involve credit system 104. In additional examples, other aspects of system 100 can further be altered or include additional or intervening elements, such as multiple users, users with shared accounts, additional merchant or retailer systems, subsystems that can operate independently, such as the use of an independent SMS service 156, or any other such structure for a system 100.

For example, the originating device 110 associated with a merchant's computing system 108 can be used as part of a transaction for items 128 by user 122. As part of a transaction session in the network, a user interface on display 114 of the originating device 110 or an associated merchant computer (e.g., operated by a merchant employee) can enable an account or credit application for funds to be used as part of the current transaction, an account lookup operation, or another similar secure authentication action. If a user 122 elects to initiate such an application, the user 122 provides the originating device 110 (or a related merchant device) with an identifier (e.g., a phone number) associated with user device 124.

Figure 2:
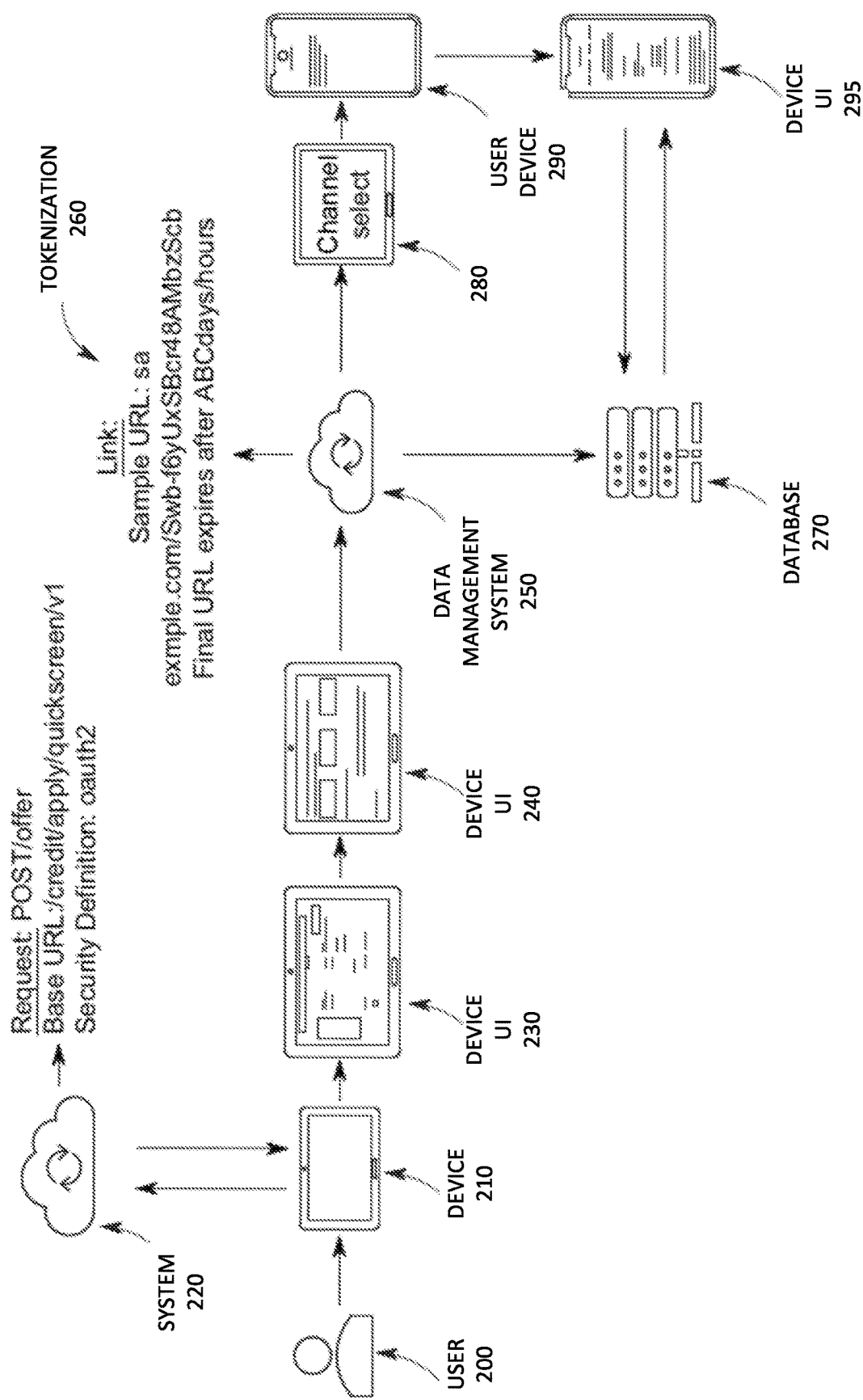
FIG. 2 illustrates aspects of data flow for network data management in accordance with embodiments described herein.

FIG. 2 then illustrates an example of network data management using a system 250 (e.g., including a digital lockbox 150). In the illustrated flow of FIG. 2, a user 200 (e.g., similar to user 122) interacts with an originating device 210 (e.g., similar to originating device 110) to initiate communication of request data. The initiation of the request data communication can occur either via a user inputting data directly to a device 210, via the user allowing a retail employee to provide this information, via a retail computing system that has information from a user automatically providing request data based on a user authorization, via a user device being authorized to provide information for request data to a retail computer system, or via any other such acceptable operations. In some examples, the request data is generated in response to offer data in a retail computer system 220. For example, when a user 200 interacts with an originating device 210, the originating device 210 can access available offers from a retail computer system 220, or suggest an account lookup option for a merchant based payment account. Offer data can be general (e.g. not based on any data specific to a user) or can be user specific (e.g. based on context or other information about user 200).

In some examples of specific offers, the retail user system can access secure data or can initiate interactions with an authentication system to access initial information about offers specific to a user. In one such example, an originating device can pass simple user information to an authentication system via a retail system. The authentication system can return a pre-qualification response as an offer with an offer identifier. A pre-qualified interface can then be presented on the originating device. The pre-qualified offer can then be presented directly to a user via the originating device, or can be made verbally to the user via a retailer employee. If the offer is accepted, the request data can include the offer identifier as identifying information associated with a particular retailer (e.g. retail location, employee information, or other such related information). In other examples, any data source can be used for initial offer, including third party data sources. In some examples, a user will interact with a user interface UI 230 at an originating device to provide additional information, generate a retail account, indicate an interest in possible offers, or provide other such information. In a request interface 240, a user selects an offer to initiate request data to a data management system (e.g. authentication entity 106).

This request data is received at data management system 250, and processed to identify an appropriate action in response to the request data. In some systems, data management system 250 can accept a variety of different types of request data, and can channel the request data to an appropriate service. In various data management systems 250, the services connected with data management system 250 can be modular, such that the services can be updated and altered seamlessly without changes to system inputs. This can allow a standard set of request data from an originating device 210 to be processed at data management system 250 as the services used by data management system 250 are updated over time. Regardless of the service associated with particular request data, as long as an associated service is identified for the request data, a secure uniform resource locator (URL) is generated in response to the request data. The secure URL (e.g. a one-time link tokenized for security) can be generated using a token service in conjunction with a URL generator service as described above in an operation of tokenization 260.

Depending on the request information, a channel selection 280 can occur to determine how the unique URL is to be communicated to a user. If the authentication service has the information to contact the user and is authorized to contact the user, the channel can be a direct channel from the authentication system to the user (e.g. via e-mail or SMS). If the authentication system is not authorized to communicate with the user, the link can be communicated to the user via the retail computing system or the originating device (e.g. via a network from the authentication system to the retailer, and then to the user device from the retail system via SMS).

When the user device receives the secure unique URL, the user device can then initiate secure communications using the token service. This can include secure applications for credit or other such actions. In the example of FIG. 2, upon receiving the request information, the authentication system not only generates the secure unique link, but also accesses a database 270 for information about the user associated with the request. Data from the database 270 can be used to generate a prefilled credit application. Use of the secure URL by the user device 290 can result in the token service providing access to the prefilled credit application at interface 295. The user can then proceed with secure communications to finalize the credit request and use any authorized credit in a purchase associated with the offer used to initiate the request. If the credit request is denied, the denial can be communicated to the user device in a manner that is opaque to a retail employee to protect user privacy.

In other examples, rather than the database 270 providing the prefilled application in response to a user device 290 using the secure unique link, the prefilled application data can be structured within a two-dimensional barcode, and communicated either to the originating device or another such device to be accessed by the user device. In such a system, the secure one-time link can be used with the two-dimensional barcode to facilitate additional communications related to the credit request or other communications between the retail computer system and the user device.

In one example, the user 200 is at a location having a point of sale (POS) device 210 connected to a computing system 220 associated with a merchant and the POS device 210. When the user 200 initiates a purchase transaction at device 210, the device 210 accesses offer or account information available from system 220. System 220 returns data that is presented via device UIs 230 and 240. When a user selects an offer via device 210, request data associated with the user selection (e.g., including a user's cell phone number for user device 290) is transmitted to system 250 (e.g., which implements or includes a digital lockbox 150 or aspects of a similar digital lockbox system). The system 250 accepts the request data using an API, and can confirm that relevant information is stored or managed by system 250. If additional data can be accessed in response to the request data that is not currently stored in system 250, system 250 can request the data, and add the data to storage or data service systems of system 250. System 250 can then use a token service in response to the request data to create a single use tokenized URL for data stored in the system 250. The API allows such single use URLs to be received at system 250 and to identify data stored in system 250 are accessible by system 250. For example, personal data for a requesting user can be kept at a location A in system 250. A tokenized single use URL can use a unique token with information about the personal data or the location A to generate a URL: sa example.com/Swb-f6yUxSBcr48AMbzScb. This URL can be associated with the network location in system 250 used to access sensitive data associated with the request data. The tokenized URL can then be communicated to user device 290 using the phone number provided with the request data. When the user device 290 receives the single use URL, the URL can be used to access relevant data in database 270 using the API of system 250 with the URL (e.g., where the API can use the unique one-time URL to identify the appropriate network location for the sensitive data). The sensitive data can then be used to facilitate additional communications between system 220 and user device 290, such as purchase transactions, account lookup operations, credit applications, etc.

Figure 3:
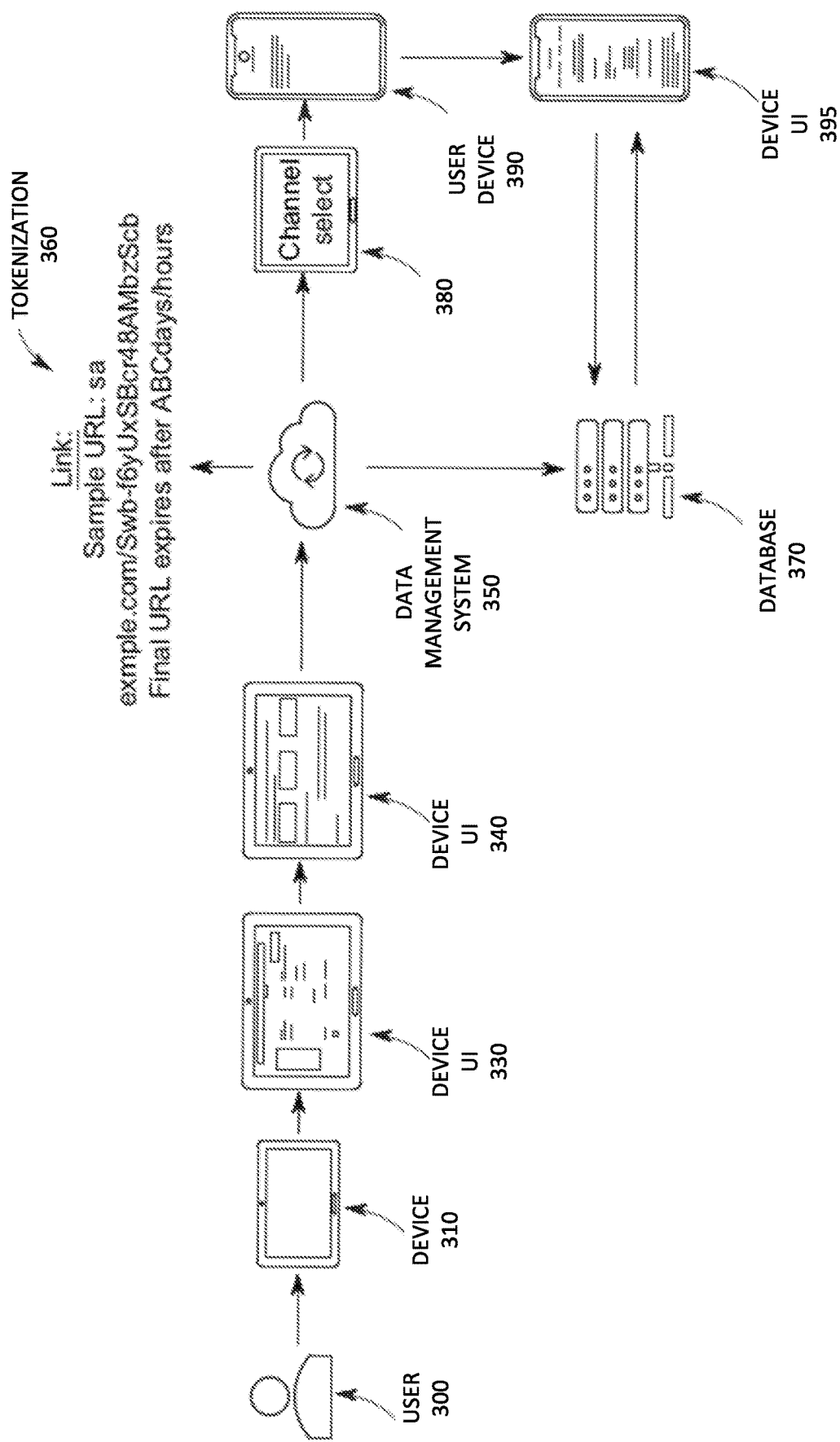
FIG. 3 illustrates aspects of data flow for network data management in accordance with embodiments described herein.

While the examples of FIG. 2 show the use of communications associated with an offer (e.g. via retail system 220), in the example of FIG. 3, the offer occurs directly via the originating device and is sent to the system 350 without prequalification or other initial communications. In such a system, a user 300 interacts with an originating device 310. Just as above, this can occur either directly or using a retail employee. Using interfaces 330 and 340, an offer is presented via the originating device, and the originating device is used to generate and send request data to system 350 (e.g., using an API to access secure data in a digital lockbox of system 350). This request data can include an application identifier, a user name and address or other such information. In some examples, this can include contact information for a user such as email or phone number information, or additional identifying information such as a date of birth. This information can then be used by system 350 as described above for generation of a secure one-time link 360, access to database 370 information, channel selection 380, and additional service operation such as presentation of the secure one-time link and associated credit offers via interfaces 390 and 395.

Figure 4:
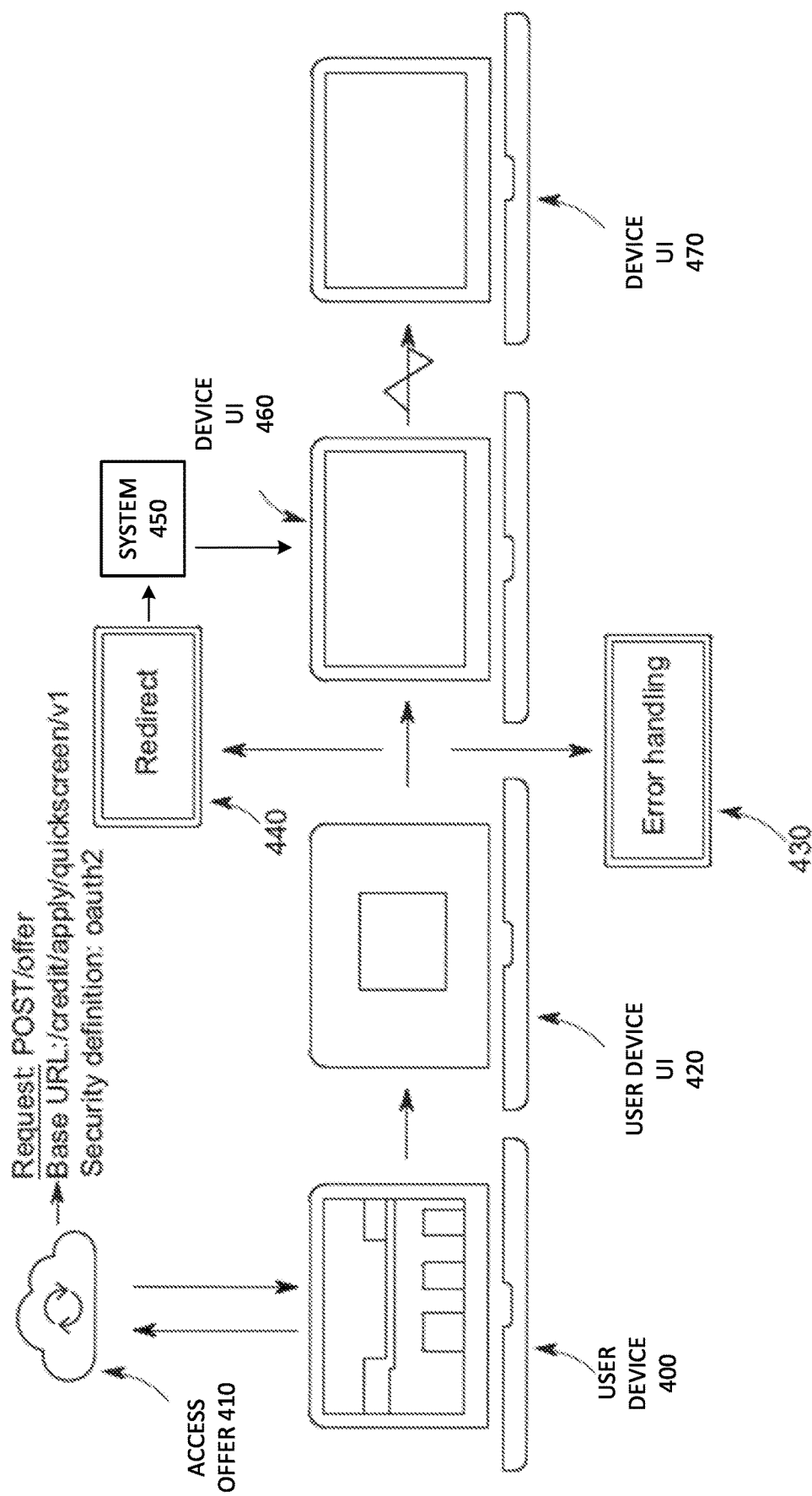
FIG. 4 illustrates aspects of data flow for network data management in accordance with embodiments described herein.
Figure 5:
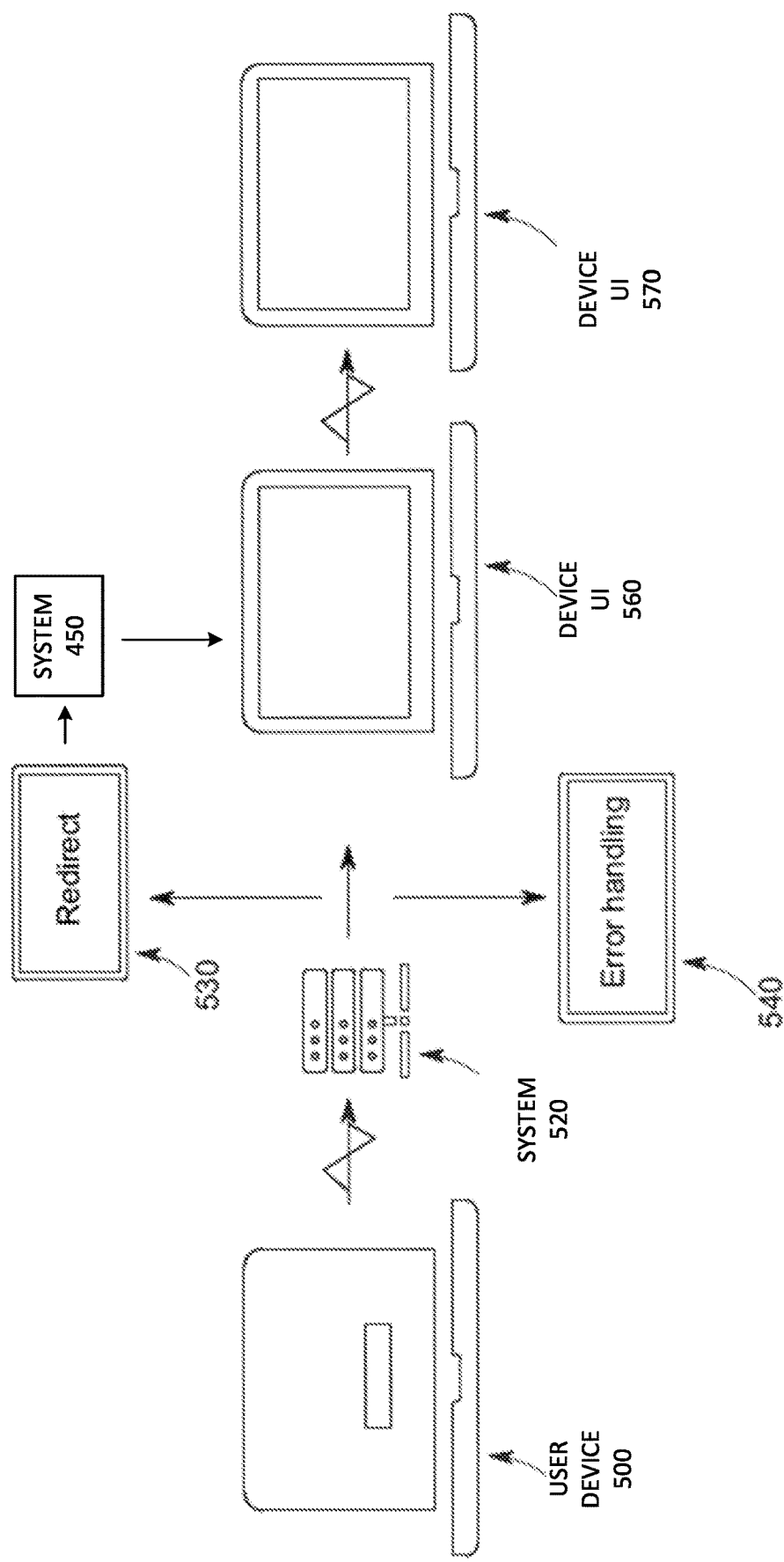
FIG. 5 illustrates aspects of data flow for network data management in accordance with embodiments described herein.

FIGS. 4 and 5 then illustrate additional examples of network data management similar to those of FIGS. 2 and 3, but in a context of a client's device operating as both the originating device and the user device (e.g. for internet communications). In FIG. 4, a user device 400 logs into a retail computer system (e.g. via a retail website). The account information associated with the login can be used to access offers 410, either from the retail computer system or from a third party. As described above, this can include accessing authentication systems for an initial prequalification of a credit offer. The offer can be presented to a user via a user interface 420. If the offer is accepted, a redirect to the authentication system occurs to generate a secure one-time link in redirect 440. This redirect 440 operation can include communication of an offer identifier, a user identifier, and any other such information. The redirect 440 can then use the API of system 450 (e.g., including a digital lockbox and tokenization service) to generate a unique token for the request data provided by redirect 440. The secure one-time link can then be communicated back to the user device. When the user device uses the secure one-time link any error handling 430 is first considered. This can include expiration of the secure one-time link, errors or corruption associated with the link, or any other such problems. For example, if the secure one-time link is shared with a device that is not authorized to use the link, an error handling 430 operation can be triggered. If no error handling 430 event occurs, then the secure communications between user device 400 and the retail computer system can proceed with secure network data management handled using the secure channel initiated with the secure one-time link. This can include further operations and a user interface 460 for a full credit application with terms, as well as an approval and other disclosure information in an interface 470. In some examples, the secure channel initiated with the secure one-time link can be an encrypted communication using RSA, AES-256 in ECB or CTR, secure communications via SDP, or any other such communication.

Similarly, as the operations of FIG. 4 are similar to the operations of FIG. 2, but without direct inclusion of a retail location, the operations of FIG. 5 are similar to the operations of FIG. 3, but via ecommerce instead of via a device which is at a retail location. In FIG. 5, a user device 500 interacts with a retail computer system 520, and receives a local offer from the retail system 520. The user accepts the offer at the user device 500, and the request data is generated and sent to the authentication system 450 (e.g., including a digital lockbox and token service) via the redirect 530 using an API for system 450. A secure one-time URL is generated, and if no error handling 540 exception is triggered, the authentication system facilitates secure communications for additional services via user interfaces 560 and 570 at the user device. As described above, this can include credit applications and responses, credit and payment transactions, or any other such secure communications.

Figure 6:
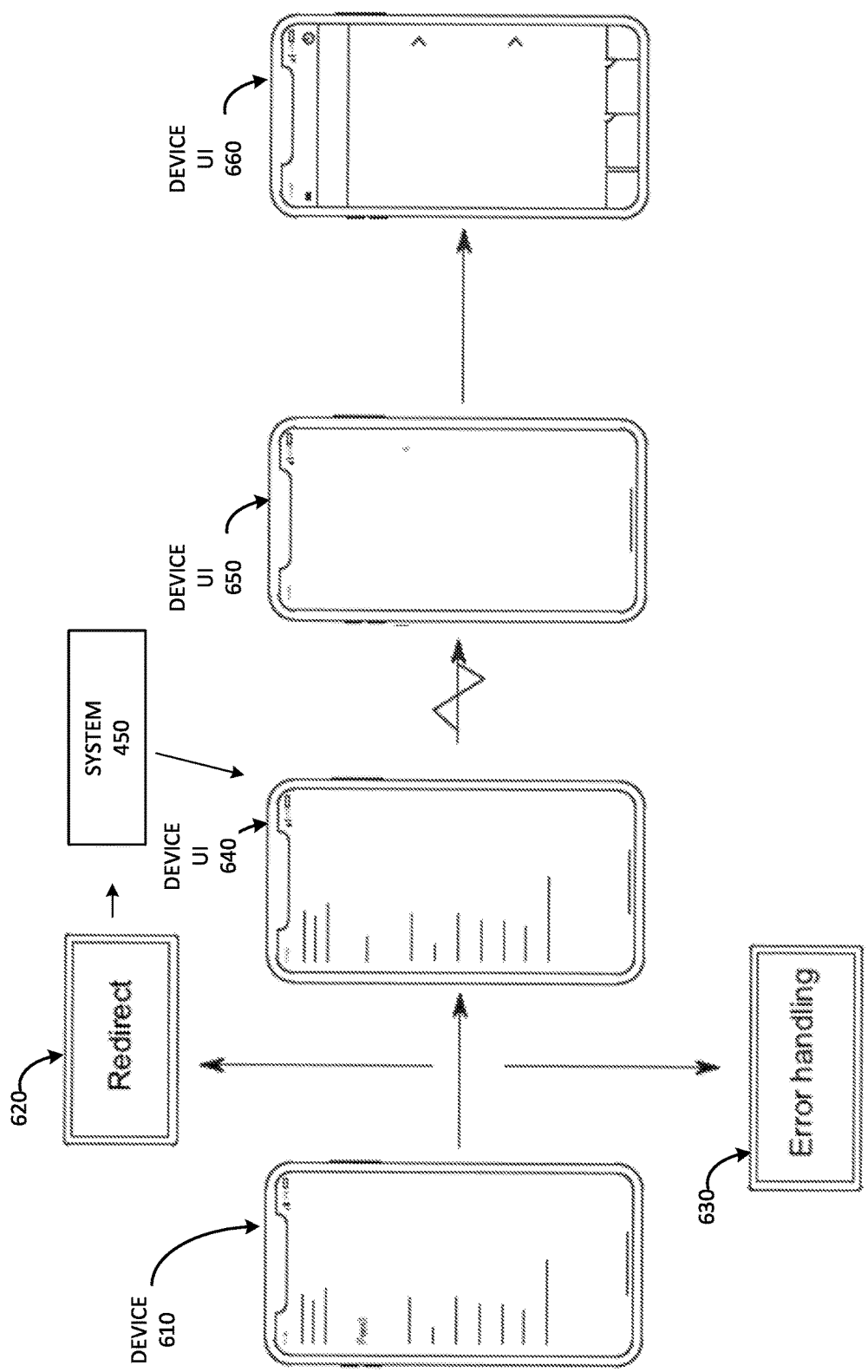
FIG. 6 illustrates aspects of data flow for network data management in accordance with embodiments described herein.

In both FIGS. 3 and 4, once a redirect to the system including the digital lockbox occurs, a unique token is generated that can be used (e.g., as part of a single use URL) via an API of associated with the digital lockbox to access secure data in the system hosting the digital lockbox. Where in FIGS. 2 and 3, the unique token is passed to a user device using a phone number, in FIGS. 3 and 4, other mechanisms can be used to securely provide the token to the user device 400, which acts as both the originating device and the user device confirming the access to the secure data in the digital lockbox of system 450. In some examples, multiple single user URLs can be used for a single session, as secure data is accessed by a user device 400, and a system (e.g., a merchant system associated with access offer 410) as the system 450 passes access to different systems to facilitate secure and private data communications between the systems. communications FIGS. 6 and 7 then illustrate similar operations to those described above for a mobile device 610 which can use multiple networks for communication. In FIG. 6, a user uses the user's mobile device 610 to initiate communication for request data (e.g., as part of a transaction or other secure communication) via the application or network server (e.g. website) of a host system (e.g. merchant or retailer). The host system manages error handling 630 and redirects 620 before system 450 (e.g., including a digital lockbox and token service) is used to access secure data. The request data is redirected to the authentication system 450, which generates a secure one-time URL. If no error handling occurs, a secure channel is established, and the user uses the secure channel to complete an application using sensitive information that is protected by the secure channel. Just as above, system 450 can use an API to accept request data via redirect 620, generate a single use tokenized URL identifying a network location (e.g., in system 450 accessible via the API of system 450) used to access secure data in the digital lockbox. User interfaces 640, 650, and 660 can be used to select a single use URL from system 450 to access data from the digital lockbox of system 450, and to perform additional access and communication operations, such as relaying secure information (or authorization to access the information) to a third system (e.g., a merchant system), or accessing additional secure or private data using the digital lockbox of system 450.

Figure 7:
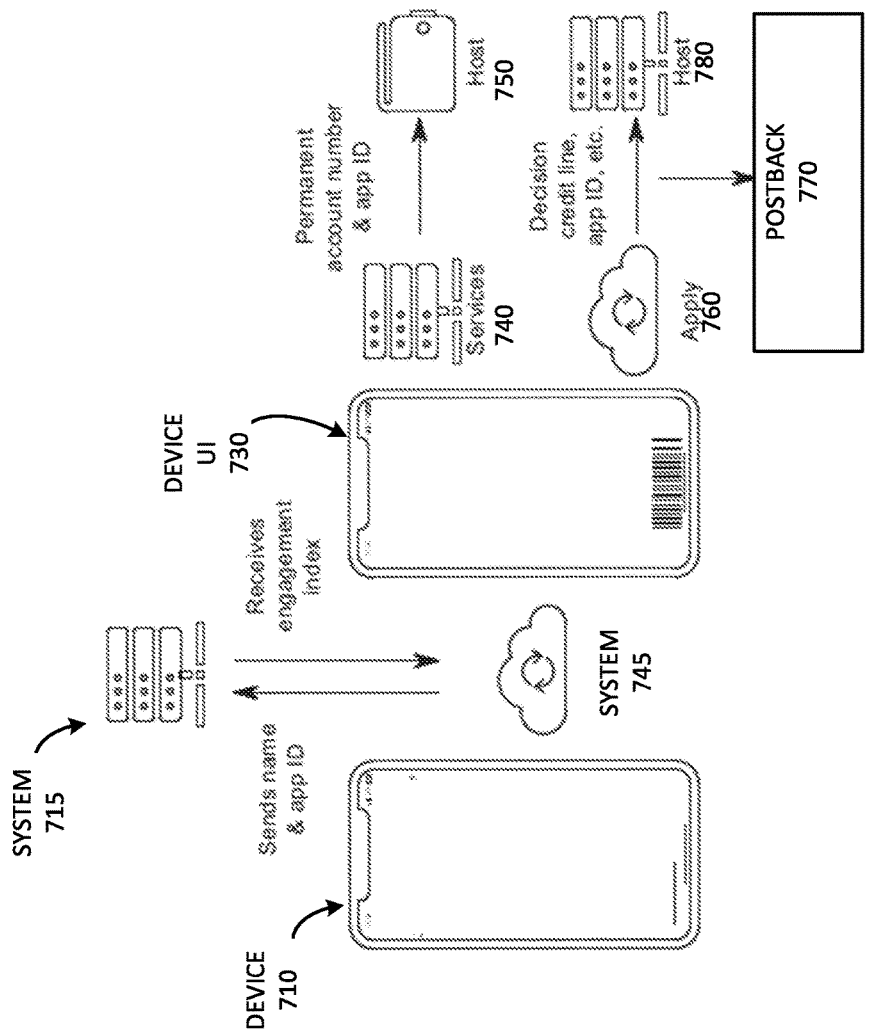
FIG. 7 illustrates aspects of data flow for network data management in accordance with embodiments described herein.

FIG. 7 illustrates similar operations, but with additional services available and initial interfaces for offers and options prior to the secure channel being established. The additional services can include initial prequalification from the authentication system or offers from third parties, presentation of various options, offers, and conditions prior to the secure channel being established, and the option to use the request data for multiple services, such as secure account data management, credit applications, and other such actions. In the example of FIG. 7, the initial request data from user device 710 is used by an authentication system 745 (e.g., including a digital lockbox and token service accessible by an API of system 745) to generate a secure one-time link, and that secure one-time link (e.g. a tokenized URL) is then used to establish a secure channel between a user device a service operated by system 715 (e.g. application for credit and use of credit at a retailer). The digital lockbox of system 745 can act as an intermediary between device 710 and system 715 to pass control tokens (e.g., associated with single use URLs identifying the location of secure data in system 745 accessible via the system 745 API) as part of a session or set of communications. Such operations can include facilitating services 740 with account number lookup operations at a host 750, or can include secure apply operations (e.g., access or credit account requests) with host 780, which can include postback 770 communications.

During any such service or operation facilitated by a digital lockbox of system 745 or any system above, a secure API can be used to access system 745. As described above, a data service of a digital lockbox can not only dynamically provide access to secure data, but can also create history data that tracks system use at various levels (e.g., user levels, device levels, business levels, location levels, service levels, etc.) In some examples, the history data can be updated in real-time as a user device and other devices access data in the digital lockbox of a system. For example, a user device 710 can be a cell phone with payment features. A user can use device 710 to access a merchant application or website to initiate a transaction (e.g., a purchase transaction for items 128). The merchant application or website can offer a user via a UI presented on device 710 both account lookup (e.g., associated with services 740) and credit application (e.g., associated with apply 760 operations) options. If a user selects an account lookup option, a redirect or request communication can be sent to system 745 to access associated secure data stored in a digital lockbox of system 745. System 745 can access secure data from system 715 or other such systems, and then generate a unique token for the data. A data service can track the request and the data gathering options, and associate the operations (e.g., both receiving the request and accessing data) with the user, the user device, and a merchant system associated with the application or website that initiated the generation of the token. As a unique single use URL is transmitted, used, and other actions are taken (e.g., dynamic access to secure data as part of account lookup via host 750, credit application via host 780, etc.), each operation can be tracked in real-time by a data service of system 745 as part of digital lockbox systems. Such tracked data can then be accessed to identify how secure data has been used by different users, user devices, merchant systems, initiating devices, etc. For example, a single merchant can offer access to secure data by any mechanism described above, including employee assisted access via POS devices in a store location, website access, mobile device application access, or any other such access. In some examples, data services for a digital lockbox can identify a set of secure data for a user, and store data on each type of access listed above, along with dates, times, data modifications, uses, results (e.g., errors, credit decisions, etc.). The data can then be aggregated across different users, merchant locations, or any other such tracked data to provide system use metrics which can be updated in real-time as data is gathered by system 745.

Figure 8:
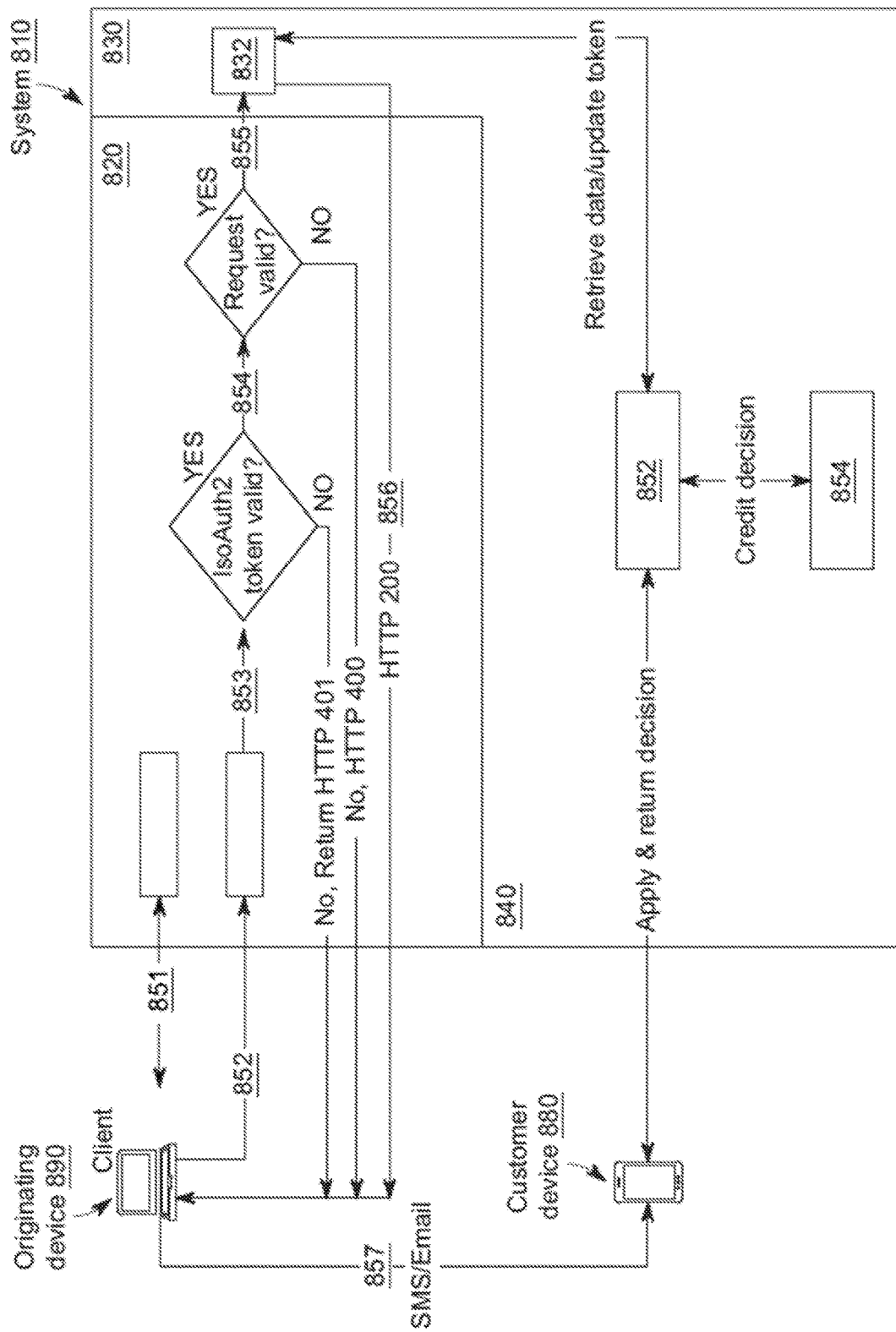
FIG. 8 illustrates aspects of data flow for network data management in accordance with embodiments described herein.

FIG. 8 then illustrates a system for network data management between an originating device 890, a user device 880, and a system 810. The system 810 includes an interface management system 820, an authentication system 830, and a credit service 840. In system 810, the interface management system 820 can be used to prevent unauthorized access to the authentication system 830. As part of such operations, originating device 890 can engage in communications 851 with an initial interface endpoint for authorization. This authorization can then be used in interface 852 for subsequent communications, such as communication of a request data associated with user device 880. The request data can be forwarded from an interface proxy in interfaces for 853 and 854 if a valid authentication token is present and a valid request is present in the request data. If both a valid authentication token (e.g. separate from the tokenized URL as an interface security feature) and a valid request are present in the request data, the request data is provided for generation of a secure one-time link at URL generate 832 of authentication system 830. The secure one-time link is passed to originating device 890 in communication 856, and can then be provided to the user device 880 in communication 857. User device 880 can then use the secure one-time link with credit service 840 for application approval via various services, such as an application interface 852 and a decision engine 854. As described, in some examples, prefill services can be used with application interface 852, or a user device can provide secure information to application interface 852, which can then be used by decision engine 854 to respond to the completed request from application interface 852 (e.g. a credit application).

Figure 9:
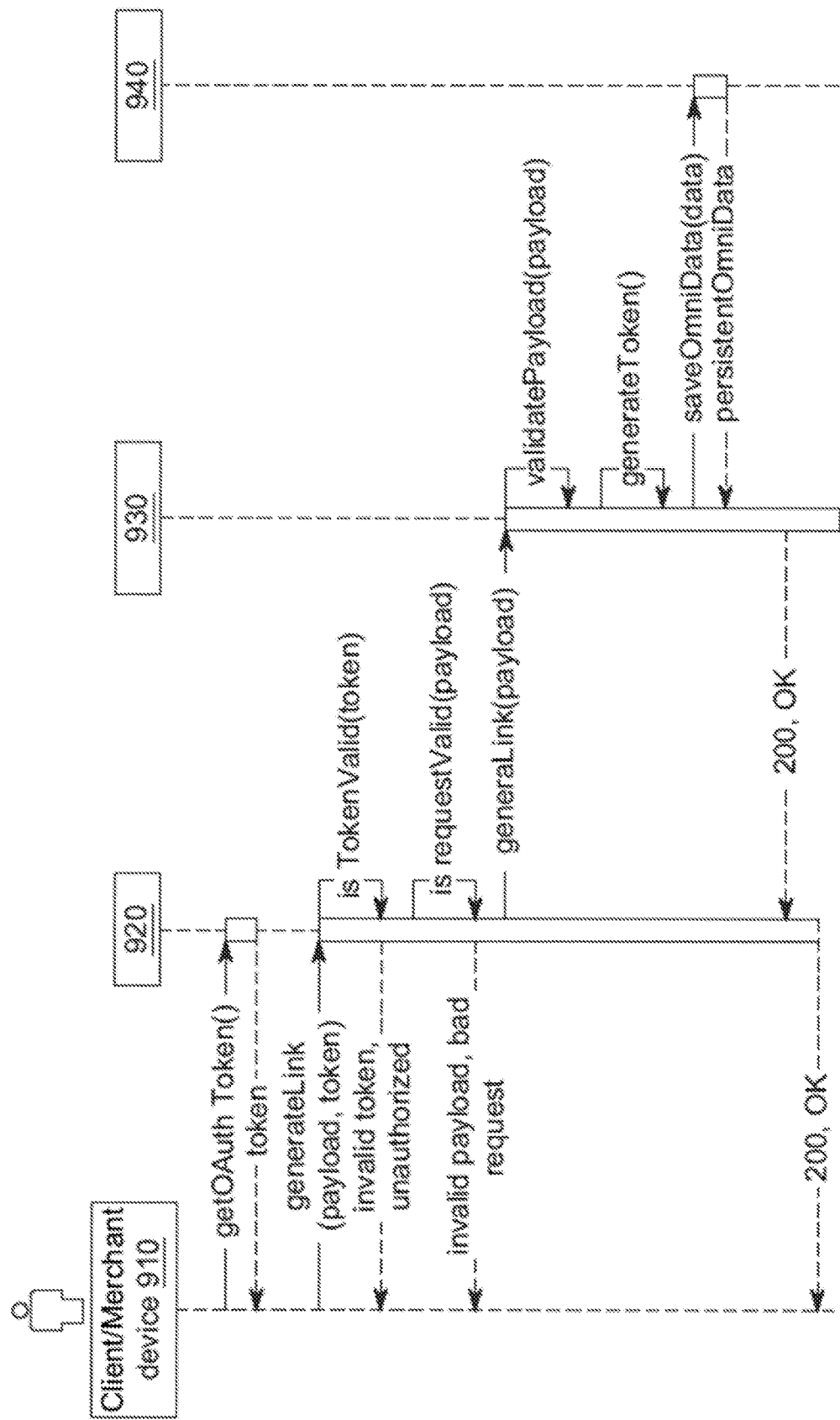
FIG. 9 illustrates aspects of data flow for network data management in accordance with embodiments described herein.

As described above, in various implementations, a user device can operate as the originating device, such as in ecommerce implementations. FIG. 9 illustrates aspects of communications with a device 910 in such an implementation. This includes communications among device 910 and various systems, such as an interface system 920, an authentication system 930, and a data store system 940. In FIG. 9, a device 910 communicates with interface system 920 for an authorization token. Request data generated by device 910 can then be sent to the authentication system 930 via interface system 920 to protect authentication system 930. If the request data includes a valid request and a valid authentication token from a previous interaction with the interface system 920, the request data can be sent to the authentication system 930. The authentication system 930 can then use the valid request from the request data to identify and manage interactions with one or more services associated with the valid request. As described above, this can include application prefill operations (e.g. in communication with data store system 940) as well as secure channel selection. In any case, a secure one-time link is generated by authentication system 930 for use in subsequent secure data management.

Figure 10:
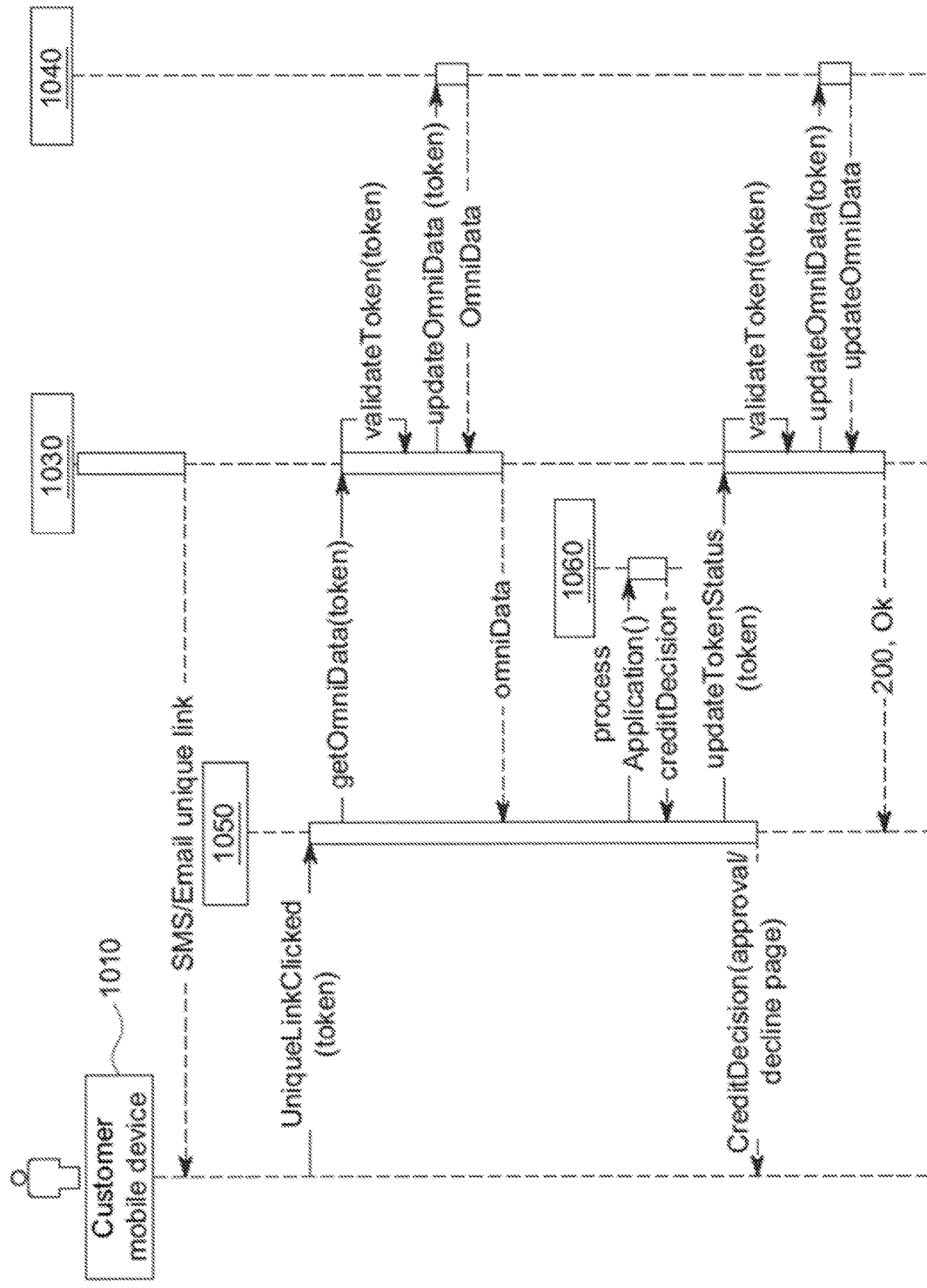
FIG. 10 illustrates aspects of data flow for network data management in accordance with embodiments described herein.

FIG. 10 then illustrates additional communications that can be part of a system similar to the system of FIG. 9. In some examples, the communications of FIG. 10 can be considered to be a continuation of the communications and operations of FIG. 9. FIG. 10 includes a user mobile device 1010 that can in some implementations be device 910. FIG. 10 also includes authentication system 1030, data store system 1040, credit interface system 1050, and credit decision system 1060. As part of the communications illustrated by FIG. 10, authentication system 1030 communicates a secure one-time link to user mobile device 1010. This secure one-time link can then be used by the user mobile device 1010 to establish secure communications with credit system 1050. When the user mobile device 010 uses the secure one-time link with credit system 1050, the credit interface system 1050 can communicate with authentication system 1030 and data store system 1040 to verify the security of the one-time link and establish the secure channel between the user mobile device 1010 and the credit interface system 1050. After validation, the credit interface system 1050 can access the credit decision system 1060 using secure verified data to generate a decision in response to the request data. The secure communication channel established and verified using the authentication system 1030 and data store system 1040 can then be used to communicate the decision data to the user mobile device 1010.

The various systems can be updated with information from the decision data for use with future communications with a client. This can include a record of the decision data and the request data, with portions of the data or related information kept in data store system 1040 for future use.

Figure 11:
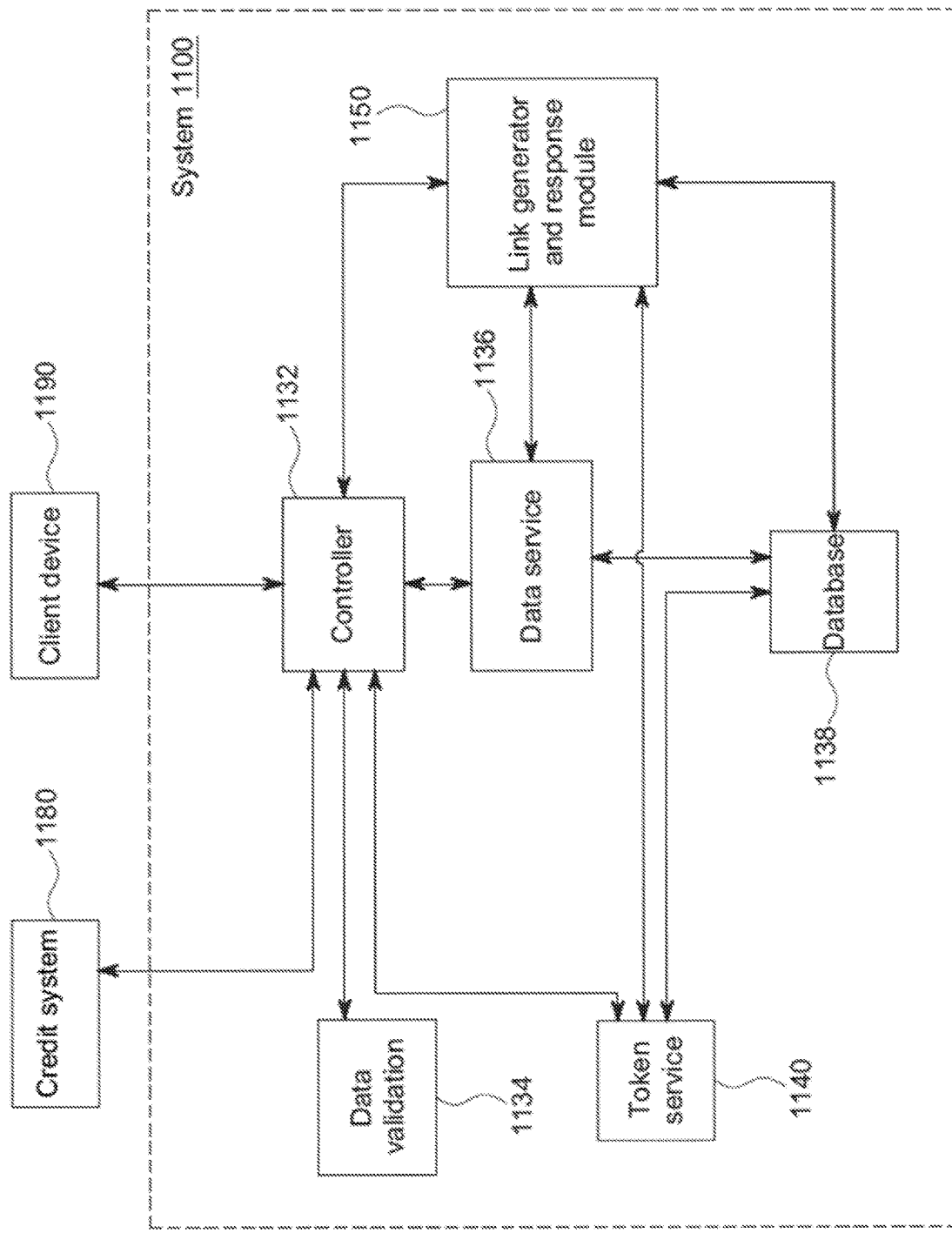
FIG. 11 shows an illustrative system for network data management and communications with client and application systems in accordance with at least one example.

FIG. 11 then illustrates an example of an authentication system 1100 in communication with a user device 1190 and a credit system 1180 in accordance with one possible implementation. In the illustrated system of FIG. 11, a user device 1190 can provide request data to the authentication system. A controller 1132 processes the incoming request data and accesses a request validation service in data validation 1134. If the request is validated, the controller 1132 initiates generation of a token using module 1150. Additional details of module 1150 are described below. Module 1150 provides a secure one-time link to controller 1132. At any point, either in parallel to or after generation of the secure one-time link, the controller can also initiate a data fetch using data service 1136. This can include any information for a service to be called in response to the request data. In some implementations, data from the data service can be used with the initiation of the generation of the token and the one-time link. In other implementations, the data from data service 1136 (e.g. using database 1138) can then be available for various services enabled by the secure one-time link and associated secure channels. The controller 1132 then initiates communication of the secure one-time line to the authorized recipient (e.g. either directly to a user device or to the user via a host, retail, or computing system).

If the controller 1132 then receives an incoming communication using the secure one-time link, the controller 1132 accesses token service 1140 to verify the authenticity of the communication. This can include fetching data from module 1150 via data service 1136 and from the token service 1140. When the secure one-time link is verified, the token status is updated at token service 1140 to prevent the one-time link from being used again. The controller can then communicate with credit system 1180 to enable secure communications for decision making and facilitating a response to the request from the user.

Figure 12:
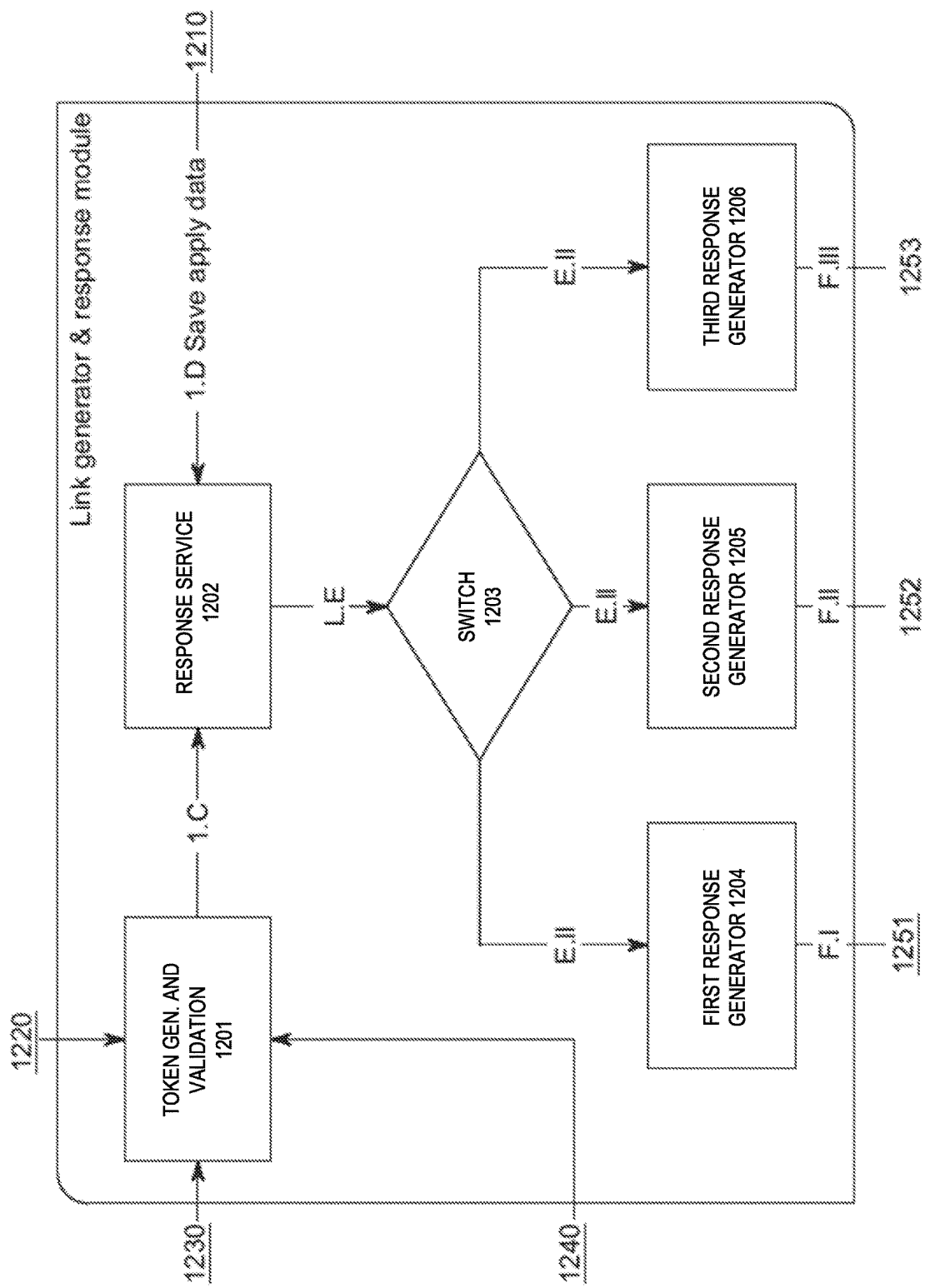
FIG. 12 shows aspects of a link generator and response system for use as part of a network data management system in accordance with at least one example.

FIG. 12 describes an example implementation of a link generator and response module. While FIG. 12 shows one implementation, it will be apparent that other implementations are possible. The example of FIG. 12 includes a token generator and validator, a response service, and a communication channel selection system for selecting between different channel options for communication of a secure one-time link. The token generator and validator can have a connection 1220 to a controller such as controller 1132 to receive a communication initiating token and secure one-time link generation module 1201. The module 1201 (e.g., a token generator and validator) can also connect to data service 1136 and token service 1140 to allow verification of a received one-time link and an update to prevent the one-time link from being reused as part of a response service 1202. The response service 1202 can communicate with the token generator and validator of module 1201 to store appropriate information in a database such as database 1138 for future verification and to prevent one-time link reuse.

For systems that allow different channels for communication of a one-time link to a user, the link generator and response module includes switch 1203 circuitry for switching delivery methods. In the illustrated implementation of FIG. 12, switch 1203 enables multiple delivery channels. The example of FIG. 12 illustrates an example with three delivery channels shown as first response generator 1204, second response generator 1205, and third response generator 1206. In some examples, possible delivery channels include a communication channel for sending a one-time link to a user via a computing system, a channel for sending a one-time link to a user directly via email, or a channel for sending a one-time link to a user via SMS. In other examples, other combinations of more or fewer channels or channel types can be included, with switching or circuitry to select one or more of the available delivery channels. Each delivery channel can include different circuitry for generating appropriate secure communications in the selected channel with the secure one-time link. When the appropriate communication is generated, the controller can receive the information via the corresponding output 1251, 1252, or 1253 of the link generator and response module. The controller then routes the secure one-time link to the user via the selected delivery channel. In some implementations, the request data identifies the channel, and the channel is selected by parsing the request data. In other implementations, the link generator and response module selects from multiple available options based on data from a data service.

Figure 13:
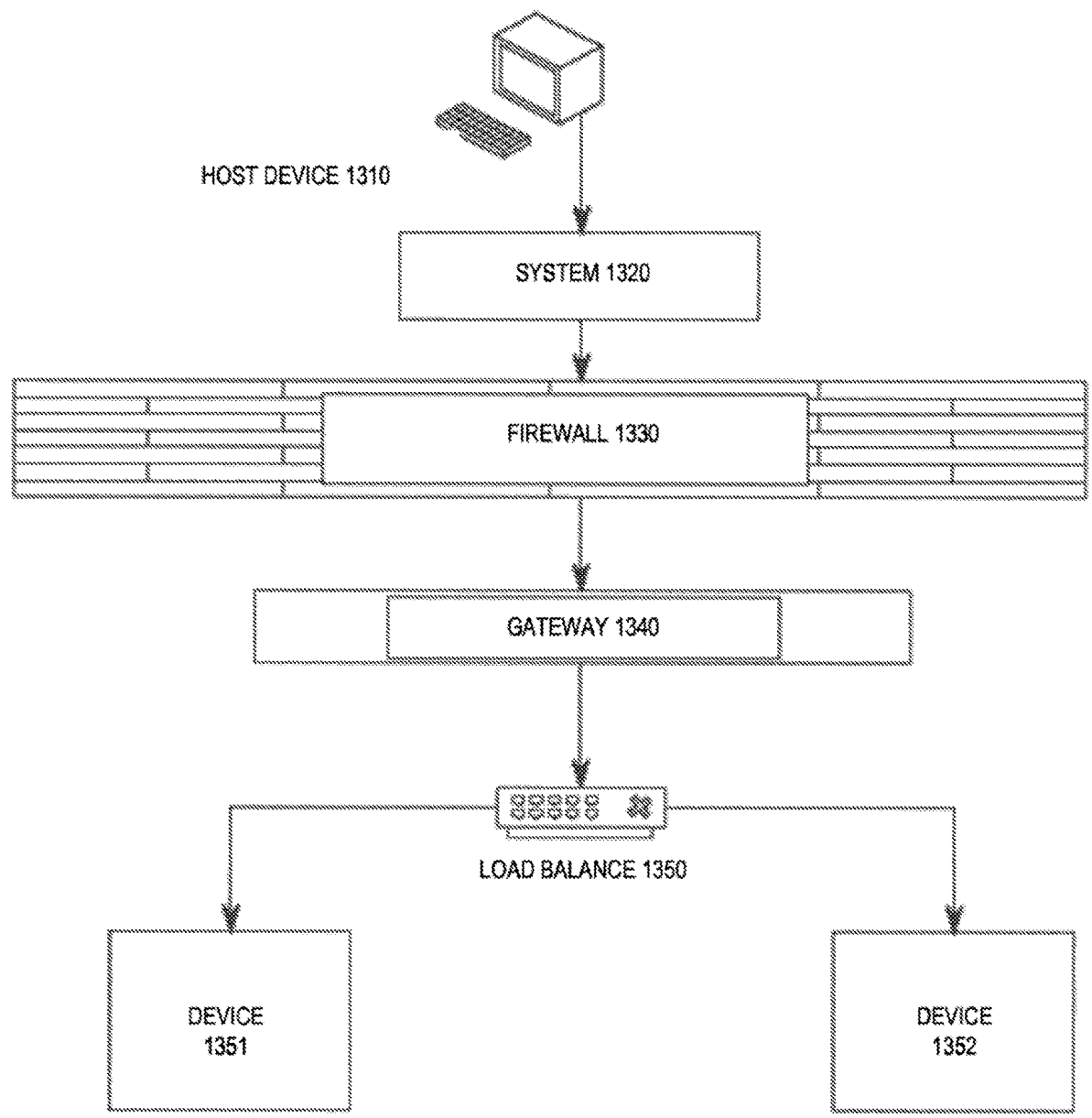
FIG. 13 shows illustrative aspects of a system for network data management in accordance with at least one example.

FIG. 13 then illustrates additional aspects of network data management in accordance with at least one embodiment. FIG. 13 includes interface system 1320 (e.g. an interface system 920) for interacting with a host device 1310 (e.g. a retail computer system) and protecting an authentication system that can include system devices 1351 and 1352. In particular, for a data management system protecting secure data, interface system 1320 can be one layer in a multi-layer secure management system for allowing a retail system and user devices, such as host device 1310, to communicate with secure data stored in the devices of the system, including system device 1351 and 1352. The interface system 1320 can thus be separated from system devices 1351 by a firewall system 1330, a gateway system 1340, and a load balancer 1350. The interface device can provide tokens to devices such as host device 1310 to authorize communications. Such a token, however, may not provide sufficient protection, and firewall system 1330 can include additional protections, including analyzing incoming request for patterns of malicious attack or improper communications. Further, some systems can be configured for large numbers of requests, and so request data for high volumes and different distributions of geographic locations originating different requests can be managed by gateway system 1340 and load balancer 1350, which can route request data to different system devices such as system device 1351 and system device 1352 based on incoming data and performance of different devices in a system.

Figure 14:
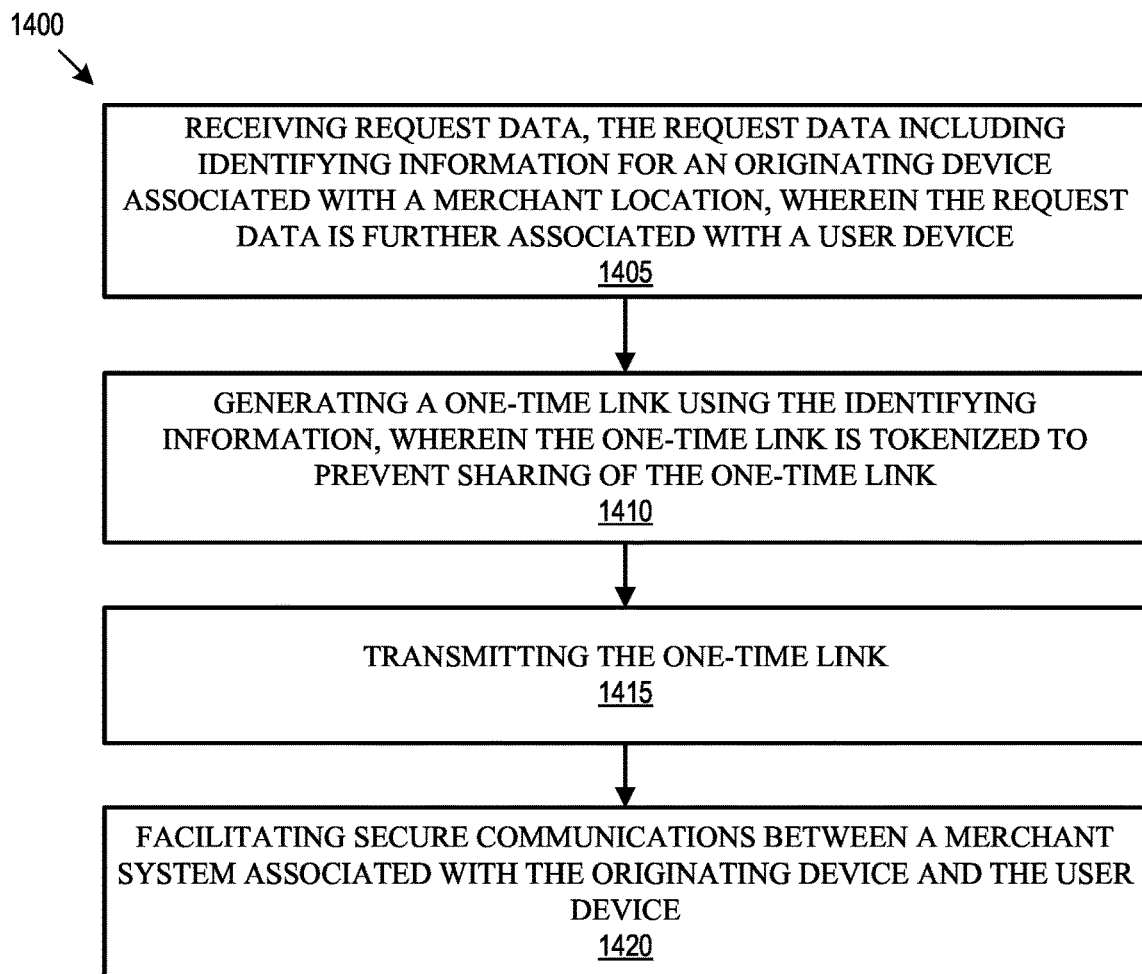
FIG. 14 shows an illustrative example of a process for network data management in accordance with at least one embodiment.

FIG. 14 is a flow diagram illustrating an example of a process 1400 in accordance with some examples. In some examples, process 1400 is performed by a networked server computer that can be an implementation of a device using computer architecture 1700. In some examples, process 1400 can be implemented as instructions in a non-transitory storage medium that cause a device to perform process 1400 when processors of the device execute the instructions.

Block 1405 of process 1400 involves a device configured to receive request data. In some examples, the request data includes identifying information for an originating device associated with a location, as well as data associated with a user device. As described above, the request data can, in some examples, include offer identifiers or other such information. Additionally, the request data can go through other filtering blocks prior to being received, such as a check to confirm that the request data includes a valid request, and other security and efficiency checks to limit loads on parts of a system performing tokenization and generating secure one-time links.

In block 1410, a secure one-time link is generated using the identifying information. As described above, the secure one-time link can be a URL generated using a large random number, and can be managed by a tokenization service that records use of the token and prevents additional use one the initial use of the token occurs. The generation of the one-time link can also be associated with additional systems for security, such as time limits on use of the one-time link, and selection of a communication channel for providing the one-time link to a user.

In block 1415, the one-time link is transmitted. The decision on a transmission channel can be selected by the request data, can be a structured part of a system (e.g. where only one transmission channel is implemented in a system), or can be selected by the system from among different possible channels. In some implementations, a system can implement communications directly to a user device, or communications to a host device operated by a merchant or retailer that can then be relayed to a user.

In block 1420, secure communications are facilitated between a computing system associated with the originating device and the user device. This can include communications about credit approval and purchases associated with such credit approval. This can also include operations prior to credit approval, such as prefill of credit applications, automatic access of data for credit applications. In some examples, other operations can be facilitated, including data storage of sensitive information, and interactions with multiple different services, including third party services.

Various implementations of process 1400, the elements can be structured in different ways, and additional operations (e.g., blocks) can be present, or the described blocks can be duplicated or implemented in different ways. In some aspects, process 1400 operates where the website is a digital lockbox accessible via an API. In such an example, no UI is associated with the website, only one or more network addresses that can accept data via the API, and communicate data (e.g., responses to requests, token passing to additional actors in a transaction, etc.) The secure one-time link can be generated from a unique token generated by or received from a token service as part of the website back-end or as part of an associated digital lockbox structure.

In some examples, the process 1400 includes operations for checking a time limit associated with the one-time link, where the decision data is further generated in response to a determination that the time limit associated with the one-time link has not been exceeded. In some examples, the one-time link is transmitted to a user device associated with the identifying information. In some examples, the one-time link is transmitted to the user device via e-mail.

Figure 15:
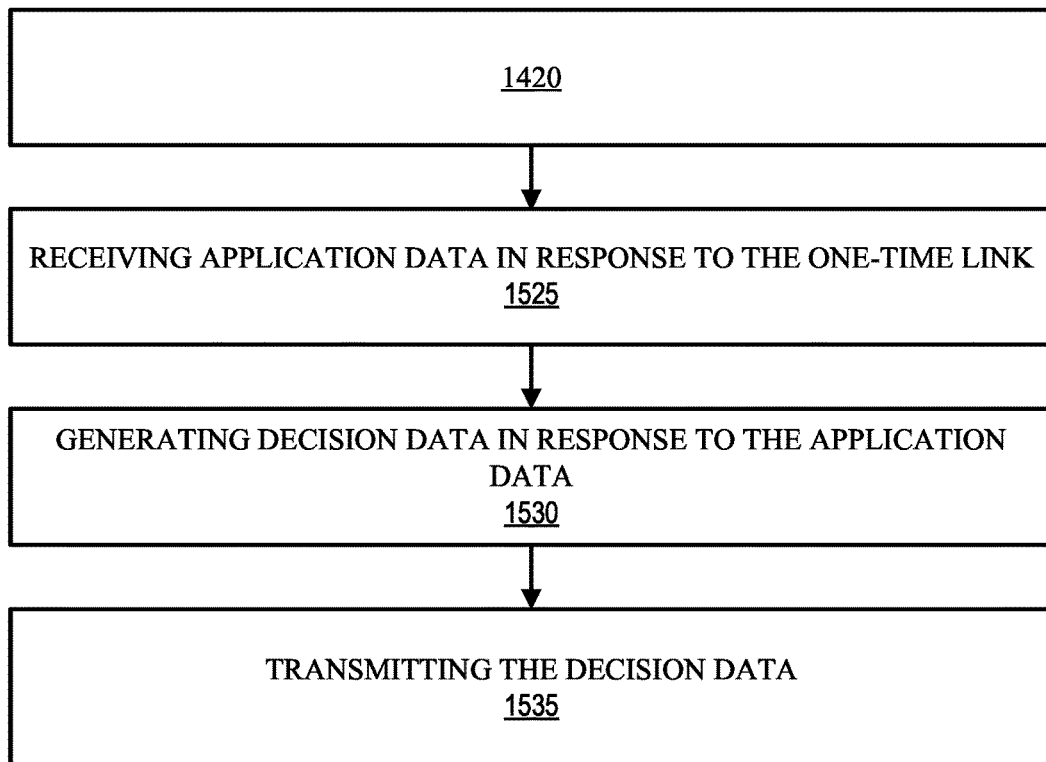
FIG. 15 shows an illustrative example of a process for network data management in accordance with at least one embodiment.

FIG. 15 then illustrates a flow diagram for a process 1500 in accordance with some examples. In some examples, process 1500 begins with block 1420, or can be an implementation of block 1420. Just as above for process 1400, process 1500 can be performed by a networked server computer, or can be implemented as instructions in a non-transitory storage medium that cause a device to perform process 1400 when processors of the device execute the instructions.

Process 1500 includes step 1525 to receive application data in response to the one-time link. In some examples, the application data is embedded in two-dimensional bar code data, and can be prefill data provided in a form associated with a two-dimensional bar code and shown to a user prior to the application data being received in response to the one-time link. In some examples, portions of the application data are communicated with the one-time link. This can also be prefill data that is presented to the user in an application interface and then returned as the application data received in response to the one-time link. In other examples, rather than being received directly from a user device, the application data is received from the originating device via a user device.

Process 1500 includes step 1530 to generate decision data in response to the application data. As described above, this can include data generated by a decision information and associated with a credit request. This sensitive information can then be communicated on a secure channel initiated using the one-time link as part of step 1535.

Step 1535 then includes transmitting the decision data. In some examples, analysis of channel authorization is performed prior to selection of a transmission channel. For example, in some embodiments, a Telephone Consumer Protection Act (TCPA) authorization is needed to communicate with a user device, and analysis of the existence of such authorization can be performed prior to transmitting the decision data. The particular channel selected as described above can be based on such an analysis, and can be used for subsequent communications with a user.

Additionally, in some examples, the application data is embedded in two-dimensional bar code data. In some examples, the application data is received from the originating device via a user device. In some examples, the one-time link is transmitted to the originating device with the application data. In some examples, decision data is based at least in part on an identification that a user is at the location based on the application data received in response to the one-time link.

While processes 1400, 1500, and the associated examples above include particular blocks or operations, it will be apparent that other steps, including intervening and repeated steps, are possible in various implementations, and that additional implementations are also possible that vary from the exact steps recited above.

FIG. 16 is a flow diagram illustrating an example of a process 1600 in accordance with some examples. In some examples, process 1600 is performed by a networked server computer that can be an implementation of a device using computer architecture 1700. In some examples, process 1600 can be implemented as instructions in a non-transitory storage medium that cause a device to perform process 1600 when processors of the device execute the instructions.

Block 1605 of process 1600 involves receiving request data, the request data including identifying information for an originating device associated with a location, wherein the request data is further associated with a user device. As described above, in some examples, the request data is received at a device operating a digital lockbox. The request can be received from a system associated with a transaction, such as a POS device, and can further be received via a path including additional systems, such as a system for a merchant or merchant location operating an originating device or a website.

Block 1610 of process 1600 involves storing secure data associated with the request data and the originating device in a digital lockbox, wherein the digital lockbox is associated with a network location. In some examples, the secure data is pre-stored in the digital lockbox as part of a secure data management system. In other examples, the data can be dynamically retrieved in real-time from additional systems in response to the data request. In some examples, the request operations of block 1605, can be analyzed by a lockbox system, which identifies in real-time that only part of the requested data is currently stored in a databased directly connected to the digital lockbox. In some such examples, the digital lockbox can dynamically, and in real-time, retrieve additional information identified as associated with the request data.

Block 1615 of process 1600 involves generating a unique token using the identifying information, and wherein the unique token is associated with the secure data in the digital lockbox at the network location. In some examples, the unique token can further be used to generate a single use URL. In still father examples, data stored in the digital lockbox can be used in generation of the single use URL. For example, encoded or secure versions of the request data or parts of the request data, can make up part of the URL.

Block 1620 of process 1600 involves transmitting the unique token. In some examples, when the unique token is received at the user device, the originating device uses the one-time link to access the secure data in the digital lockbox at the network location. In some examples, a unique token can be assigned to a transaction, and passed to different parties depending on various communications. In some examples, the unique token is received at a counterparty (e.g., merchant, seller, etc.) system, and is used to access the secure data in the digital lockbox at the network location after authorization to share the data is provided by a user device for the digital lockbox to share the secure data with a counterparty.

Block 1625 of process 1600 involves facilitating secure communications between a computing system associated with the originating device and the user device. In various examples, the secure communications can involve financial data, such as an account balance, information for a credit request or an increase in a credit limit, or other such data to dynamically adjust payment sources or payment options in a purchase transaction. In other examples, other such secure data can be dynamically communicated, updated, and managed using such a digital lockbox with process 1600.

Block 1630 of process 1600 involves dynamically updating the digital lockbox with tracking data associated with the secure communications. The secure communications of block 1625 can include placing sensitive data into the digital lockbox (e.g., from a user's device that receives the unique token and uses the unique token to access the digital lockbox), accessing secure data in the digital lockbox (e.g., from a merchant system or user's device authorized to view secure data in the digital lockbox, such as account status or balance data, or credit application data), or secure requests to delete data from the digital lockbox (e.g., by a user associated with the data). As such secure communications occur, the digital lockbox can both participate in the communications, and update history data stored as part of the digital lockbox. The history data can be a database of aggregated tracking data from multiple secure communication sessions facilitated by the digital lockbox system. The tracking data for each secure communication session can either include details of the secure communications, or history data taken from the secure communications. In some systems, such tracking data can be used to dynamically update history data, and metrics derived from the history data, in real-time. Examples of metrics derived from history data (e.g., which is aggregated tracking data from secure communication sessions) can include metrics for one or more of: a per point of sale (POS) device offer acceptance rate, a per POS device use rate associated with the digital lockbox, a per location offer acceptance rate, a per location use rate associated with the digital lockbox and a plurality of locations including the location, and security flag occurrence rates. In other examples, other such metrics can be used, including any metric derived from any aspect of a secure communication facilitated by a digital lockbox system. The tracking can include not just details of data placed in a secure lockbox, but peripheral security analysis of such communications. The security flags tracked can, in some examples, include details of network paths taken by incoming secure data or requests for data, error flags, token histories, or other such information associated with data security. In some examples, the dynamic data service tracking can track instances of attempts to re-use a single use URL as a possible security threat, and can take security actions (e.g., alerts, verification requests, etc.) when such metrics meet or exceed certain thresholds (e.g., a number of re-use attempts, a re-use attempt rate over a certain time period, etc.). In some examples, the form used with the single use URL can additionally include security details, and details of the form can be included in tracking data, along with revisions to such forms or changes in API syntax. Examples can track API syntax errors that can possibly be attacks on a digital lockbox. Examples can track user selections for selectable features, such as a time for storing secure data in the digital lockbox (e.g., one hour, one day, one week, until approval of a current transaction is communicated to the digital lockbox, etc.), data management notifications to be sent to a user based on data access, data modifications, or account changes, or other such user selectable security options. In some examples, a digital lockbox can have default settings for automatic deletion of data, which can be modified by a user selection, and such selections can be included in tracking data.

In some examples, in addition to facilitating secure communications, the digital lockbox can track data access in real-time, and can dynamically update data and associated metrics stored in a digital lockbox during repeated or simultaneous instances of process 1600 (or other similar processes) executed by a system. For example, in one implementation a merchant with 10 store locations and 20 POS originating devices at each store, and an online website, can use a digital lockbox system to offer promotional credit terms to system users. The terms can be associated with specific products, specific times, or any other such criteria. When a user (e.g., user 122) initiates a checkout to make a purchase (e.g., with items 128) either via a POS (e.g., an originating device 110 in a store location) or via the user's device using a merchant website (e.g., user device 124 acting as an originating device), the merchant's system can present an offer via a user interface of the originating device.

When the user indicates an interest in accepting the offer (e.g., via a user interface selection), request data can be sent to a digital lockbox system as described above. The digital lockbox system can not only perform the operations described above, but can also dynamically record additional data associated with the request, such as the identity of a specific POS involved in the transaction, the identify of a merchant employee logged in to the POS at the time of the transaction, details associated with the items in the transaction, or a specific offer criteria associated with the transaction, or any other such data. Such data can be stored in real-time as the transaction is occurring, and as the above security operations (e.g., use of a random token and/or a single use URL) and communications are occurring. As tokens and URLs are generated for a transaction, this information can be dynamically tracked in real-time as well. If a transaction is interrupted, or encounters an error (e.g., due to an improper API call, missing data, or any other such error), this information can also be stored in real-time. Over time, metrics can be accumulated at various different levels, such as merchant location levels, POS levels, employee identifier levels, offer levels, customer levels, or any other such level. Additionally, website transactions where a user device acts as an originating device can also be associated with such metrics, if a merchant presents comparable offers via both in-store POS devices and the merchant's website. Real-time dynamic tracking of such data can compare in store metrics against website metrics. Such metrics (e.g., derived from history data) tracked via the digital lockbox system can be dynamically accessed to analyze system performance, and the metrics can include successful sale rates following transmission of an initial single use URL, error rates, or any other such rates across combinations of criteria. As real-time data is added to the system for additional instances of the processes described above, the analysis data can be dynamically updated to reflect the addition of new data. In some examples, this can involve dynamically storing session data for the computing system in the digital lockbox, wherein the computing system is associated with the digital lockbox, wherein the session data tracks unique tokens and secure participants associated with the merchant, wherein the secure participants include one or more of a store level participant, a plurality of originating device level participants, and an employee level participant and updating the session data in real time based on the secure communications between the computing system and the user device.

In some examples, process 1600 includes generating a one-time link using the unique token, wherein transmitting the unique token comprises transmitting the one-time link. In some examples, process 1600 includes generating a single-use uniform resource locator (URL) using the unique token, wherein transmitting the unique token comprises transmitting the single-use URL, and wherein the single-use URL identifies the network location of the digital lockbox. In some examples, when the unique token is transmitted to the user device via single message service text data, a Telephone Consumer Protection Act (TCPA) authorization to communicate with the user device is received prior to transmission of the unique token.

In some examples, facilitating secure communications between the computing system and the user device includes: generating two-dimensional bar code data using the unique token, and transmitting the two-dimensional bar code, wherein when the two-dimensional bar code is received at the user device, the user device uses the two-dimensional bar code with the originating device to validate the user device to the computing system.

Some examples further involve receiving application data via the digital lockbox at the network location associated with the unique token, generating decision data using the application data, and transmitting the decision data, wherein when the decision data is received at the user device, the decision data is used to facilitate a transaction at the location.

In some examples, facilitating secure communications between the computing system and the user system includes: generating auto populated application data using a single-use uniform resource locator (URL) generated with the unique token, wherein when the auto populated application data is received at the user device, the user device uses the auto populated application data to transmit an application including the auto populated application data to the computing system. In some examples, facilitating secure communications between the computing system and the user device includes: receiving application data via the digital lockbox, wherein when the application data is received from the user device using a single-use uniform resource locator (URL) associated with the unique token, the application data and the single-use URL are passed to the computing system via the originating device.

Data can be placed in the digital lockbox, retrieved from the digital lockbox, and removed from the digital lockbox in a variety of ways. In some examples, a secure system, such as a merchant system, a credit card system, a user's personal system, or other such systems can store sensitive data in a digital lockbox prior to any transaction occurring, in order to have the data available and secure. In some examples, during operations described above, a user can respond to a single use URL to place secure data in the digital lockbox. For example, a single use URL can be integrated with a form UI on a user's device to accept an input of sensitive data. When the user fills out the form on the user's device, the UI can use the single use URL to place the secure data in the digital lockbox. Additional attempts to use the secure one-time link (e.g., to update or modify the sensitive information in the digital lockbox) will be rejected. In some examples, the dynamic data service tracking can track such instances of attempts to re-use a single use URL as a possible security threat, and can take security actions (e.g., alerts, verification requests, etc.) when such metrics meet or exceed certain thresholds (e.g., a number of re-use attempts, a re-use attempt rate over a certain time period, etc.). The form used with the single use URL can additionally include security details that can be selectable in the UI, such as a time for storing secure data in the digital lockbox (e.g., one hour, one day, one week, until approval of a current transaction is communicated to the digital lockbox, etc.). Any such deletion indication selected in the UI can be used to remove data from the digital lockbox. In some examples, a digital lockbox can have default settings for automatic deletion of data, which can be modified by a user selection. For example, a default may be to store secure data indefinitely, which could be modified by a user selecting all data for the user to be deleted at the end of the transaction (e.g., including data not associated with the transaction that has been stored by the digital lockbox.) In another example, a default may be to keep general secure information associated with a user, but to delete additional secure information provided by a user after a predefined return or security period (e.g., 30 days, two months, six months, etc.). The default can be adjusted by the user to store all information indefinitely, until an alternate selection is provided by the user.

Similar to processes 1400, 1500, and the associated examples above, while process 1600 includes particular blocks or operations, it will be apparent that other steps, including intervening and repeated steps, are possible in various implementations, and that additional implementations are also possible that vary from the exact steps recited above.

Figure 17:
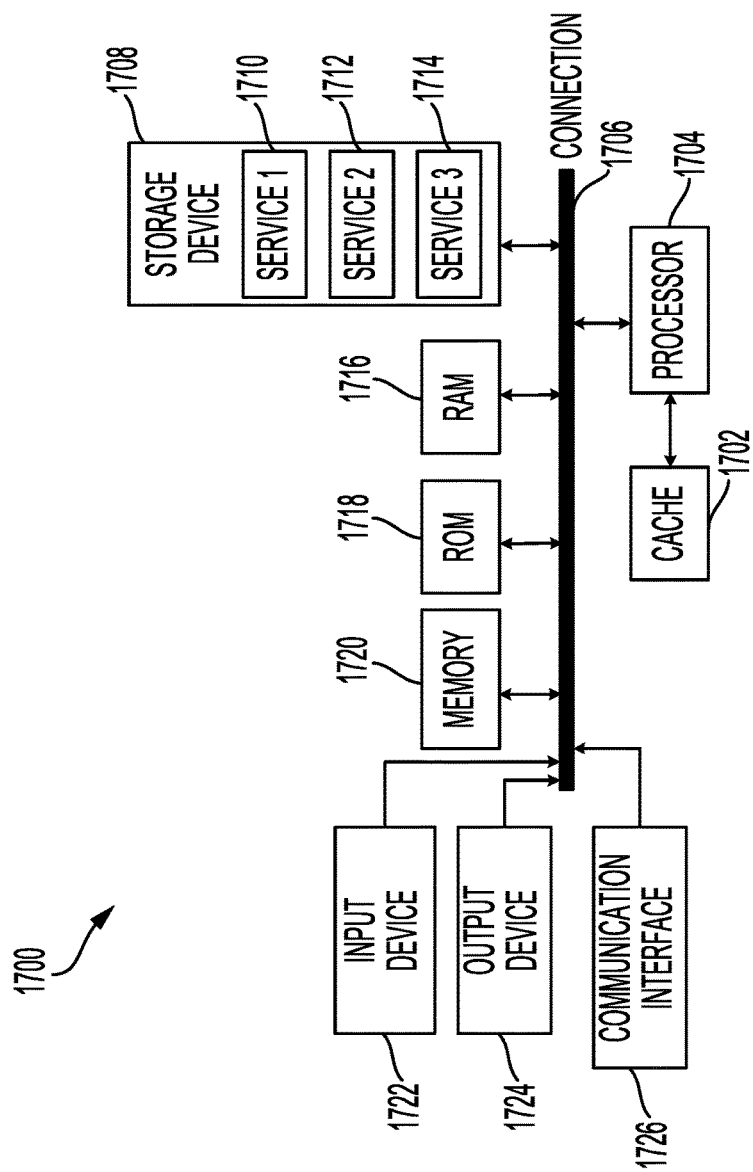
FIG. 17 shows a computing system architecture including various components in electrical communication with each other using a connection in accordance with various embodiments.

FIG. 17 illustrates a computing system architecture 1700 including various components in electrical communication with each other using a connection 1706, such as a bus, in accordance with some implementations. Example system architecture 1700 includes a processing unit (CPU or processor) 1704 and a system connection 1706 that couples various system components including the system memory 1720, such as ROM 1718 and RAM 1716, to the processor 1704. The system architecture 1700 can include a cache 1702 of high-speed memory connected directly with, in close proximity to, or integrated as part of the processor 1704. The system architecture 1700 can copy data from the memory 1720 and/or the storage device 1708 to the cache 1702 for quick access by the processor 1704. In this way, the cache can provide a performance boost that avoids processor 1704 delays while waiting for data. These and other modules can control or be configured to control the processor 1704 to perform various actions.

Other system memory 1720 may be available for use as well. The memory 1720 can include multiple different types of memory with different performance characteristics. The processor 1704 can include any general purpose processor and a hardware or software service, such as service 1 1710, service 2 1712, and service 3 1714 stored in storage device 1708, configured to control the processor 1704 as well as a special-purpose processor where software instructions are incorporated into the actual processor design. The processor 1704 may be a completely self-contained computing system, containing multiple cores or processors, a bus, memory controller, cache, etc. A multi-core processor may be symmetric or asymmetric.

To enable user interaction with the computing system architecture 1700, an input device 1722 can represent any number of input mechanisms, such as a microphone for speech, a touch-sensitive screen for gesture or graphical input, keyboard, mouse, motion input, speech and so forth. An output device 1724 can also be one or more of a number of output mechanisms known to those of skill in the art. In some instances, multimodal systems can enable a user to provide multiple types of input to communicate with the computing system architecture 1700. The communications interface 1726 can generally govern and manage the user input and system output. There is no restriction on operating on any particular hardware arrangement and therefore the basic features here may easily be substituted for improved hardware or firmware arrangements as they are developed.

Storage device 1708 is a non-volatile memory and can be a hard disk or other types of computer readable media which can store data that are accessible by a computer, such as magnetic cassettes, flash memory cards, solid state memory devices, digital versatile disks, cartridges, RAMs 1716, ROM 1718, and hybrids thereof.

The storage device 1708 can include services 1710, 1712, 1714 for controlling the processor 1704. Other hardware or software modules are contemplated. The storage device 1708 can be connected to the system connection 1706. In one aspect, a hardware module that performs a particular function can include the software component stored in a computer-readable medium in connection with the necessary hardware components, such as the processor 1704, connection 1706, output device 1724, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the provided examples. A process may correspond to a method, a function, a procedure, a subroutine, a subprogram, etc. When a process corresponds to a function, its termination can correspond to a return of the function to the calling function or the main function.

User devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials.

The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
    transmitting, by an originating device associated with a location, request data, the request data including identifying information for the originating device, and identifying information from a user device;
    receiving, by the originating device, a unique token, wherein when the unique token is received from the user device, the unique token is associated with a network location for a digital lockbox storing sensitive user data associated with the user device;
    accessing the sensitive user data in the digital lockbox at the network location using the unique token; and
    establishing secure communications between a computing system associated with the originating device and the user device using the sensitive user data.

2. The computer-implemented method of claim 1, further comprising:
    facilitating a dynamic update to tracking data at the digital lockbox associated with the secure communications.

3. The computer-implemented method of claim 1, wherein the unique token is received as part of a one-time universal resource locator (URL) link that identifies the network location of the digital lockbox.

4. The computer-implemented method of claim 1, wherein the request data includes a Telephone Consumer Protection Act (TCPA) authorization to communicate with the user device.

5. The computer-implemented method of claim 1, further comprising tracking acceptance rate data at the originating device, wherein the originating device is a sale (POS) device, and wherein the acceptance rate data includes the request data.

6. The computer-implemented method of claim 1, wherein the request data further includes location level data, employee data, and regional level data associated with a merchant operating the originating device.

7. The computer-implemented method of claim 1, further comprising:
 transmitting real-time transaction data to the network location for the digital lockbox for real-time dynamic tracking of access to the sensitive user data.

8. A device comprising:
 a memory; and
 one or more processors coupled to the memory and configured to perform operations comprising:
 transmitting request data, the request data including identifying information for the device, and identifying information from a user device;
 receiving a unique token, wherein when the unique token is received from the user device, the unique token is associated with a network location for a digital lockbox storing sensitive user data associated with the user device;
 accessing the sensitive user data in the digital lockbox at the network location using the unique token; and
 establishing secure communications between a computing system associated with the device and the user device using the sensitive user data.

9. The device of claim 8, wherein the one or more processors are further configured to perform operations comprising:
 facilitating a dynamic update to tracking data at the digital lockbox associated with the secure communications.

10. The device of claim 8, wherein the unique token is received as part of a one-time universal resource locator (URL) link that identifies the network location of the digital lockbox.

11. The device of claim 8, wherein the request data includes a Telephone Consumer Protection Act (TCPA) authorization to communicate with the user device.

12. The device of claim 8, wherein the one or more processors are further configured to perform operations comprising:
 tracking acceptance rate data at the device, wherein the device is a sale (POS) device, and wherein the acceptance rate data includes the request data.

13. The device of claim 8, wherein the request data further includes location level data, employee data, and regional level data associated with a merchant operating the device.

14. The device of claim 8, wherein the one or more processors are further configured to perform operations comprising:
 transmitting real-time transaction data to the network location for the digital lockbox for real-time dynamic tracking of access to the sensitive user data.

15. A computer readable storage medium comprising instructions that, when executed by one or more processors of a device, cause the device to perform operations comprising:
 transmitting, by an originating device associated with a location, request data, the request data including identifying information for the originating device, and identifying information from a user device;
 receiving, by the originating device, a unique token, wherein when the unique token is received from the user device, the unique token is associated with a network location for a digital lockbox storing sensitive user data associated with the user device;
 accessing the sensitive user data in the digital lockbox at the network location using the unique token; and
 establishing secure communications between a computing system associated with the originating device and the user device using the sensitive user data.

16. The computer readable storage medium of claim 15, wherein the instructions further cause the device to perform operations comprising:
 facilitating a dynamic update to tracking data at the digital lockbox associated with the secure communications.

17. The computer readable storage medium of claim 15, wherein the unique token is received as part of a one-time universal resource locator (URL) link that identifies the network location of the digital lockbox.

18. The computer readable storage medium of claim 15, wherein the request data includes a Telephone Consumer Protection Act (TCPA) authorization to communicate with the user device.

19. The computer readable storage medium of claim 15, wherein the instructions further cause the device to perform operations comprising:
 comprising tracking acceptance rate data at the originating device, wherein the originating device is a sale (POS) device, and wherein the acceptance rate data includes the request data.

20. The computer readable storage medium of claim 15, wherein the instructions further cause the device to perform operations comprising:
 transmitting real-time transaction data to the network location for the digital lockbox for real-time dynamic tracking of access to the sensitive user data.

* * * * *